United States Patent [19]

Deering

[11] Patent Number: 4,800,431
[45] Date of Patent: Jan. 24, 1989

[54] VIDEO STREAM PROCESSING FRAME BUFFER CONTROLLER

[75] Inventor: Michael F. Deering, Mountain View, Calif.

[73] Assignee: Schlumberger Systems and Services, Inc., Sunnyvale, Calif.

[21] Appl. No.: 892,727

[22] Filed: Jul. 29, 1986

Related U.S. Application Data

[63] Continuation of Ser. No. 590,980, Mar. 19, 1984, abandoned.

[51] Int. Cl.$^4$ .............................................. H04N 5/14
[52] U.S. Cl. ................................. 358/160; 358/21 R; 358/280; 358/903
[58] Field of Search ................. 358/10, 11, 21 R, 107, 358/139, 140, 94, 160, 256, 280, 903, 12, 141; 364/514, 518, 521, 552; 360/9.1; 382/8, 10, 41, 50, 58, 61; 340/718, 720, 723, 789, 798, 799

[56] References Cited

U.S. PATENT DOCUMENTS

| | | | |
|---|---|---|---|
| 3,829,831 | 8/1974 | Yamamoto et al. | 382/38 |
| 3,849,762 | 11/1974 | Fujimoto | 382/30 |
| 4,040,009 | 8/1977 | Kadota | 382/21 |
| 4,110,737 | 8/1978 | Fahey | 382/30 |
| 4,149,264 | 4/1979 | Hamada et al. | 364/900 |
| 4,200,861 | 4/1980 | Hubach | 382/30 |
| 4,344,146 | 8/1982 | Davis, Jr. et al. | 382/8 |

OTHER PUBLICATIONS

William Newman and Robert Sproull, "Raster Graphics Fundamentals" from Principles of Interactive Computer Graphics, 23rd Edition, 1979.
Alan H. Bond and Hilary Buxton, "Use of Programmable Parallel Hardware for Industrial Vision", SPIE, vol. 336, Robot Vision, 1982.
F. A. Williams, "An Expandable Single-IC Digital Filter/Correlator", TRW LSI Products, 1982.
Gerald J. Agin, "An Experimental Vision System for Industrial Application"; Stanford Research Institute, Jun. 1975.
E. J. Delp, T. N. Mudge, L. J. Siegel, H. J. Siegel, "Parallel Processing for Computer Vision"; SPIE, vol. 336, Robot Vision, 1982.
I. N. Robinson and A. G. Corry, "VLSI Architectures for Low-Level Image Processing"; General Electric Co., Hirst Research Centre.
"Model TDC1023J—Advance Information Specification Sheet"; TRW LSI Products, 1979.
"Processor-Per-Pixel Design Speeds Image Processing for Real-Time Applications"; Electronic Design, Mar. 1983.
Paul Kinnucan, "Machine that See"; High Technology, Apr. 1983.
M. L. Baird, "Sight-1: A Computer Vision for Automated IC Chip Manufacture"; IEEE Transactions on Systems, Man, and Cybernetics, vol. SMC-8, No. 2, Feb. 1978.
Michael F. Deering, "Real-Time Natural Scene Analysis for a Blind Prosthesis"; Fairchild Technical Report No. 622, Aug. 1982.
D. H. Ballard and C. M. Brown, "Computer Vision"; Prentice-Hall, Inc. Chapter 2 and 3, Sections 3.1 thru 3.3, 1982.
P. R. Cohen and E. A. Feigenbaum, "The Handbook of Artificial Intelligence"; HeurisTech Press, William Kaufmann, Inc., vol. 3, Chapter XIII, Sections C3 thru C6, D1, E1 thru E4, and F1 thru F3.

*Primary Examiner*—John W. Sheppard
*Assistant Examiner*—Michael D. Parker
*Attorney, Agent, or Firm*—Theodore S. Park; Bruce D. Riter; Paul C. Haughey

[57] ABSTRACT

A video stream processing system frame buffer controller for controlling external dynamic random access memory (DRAM) of a frame buffer and interfacing to the video stream processing signal bus. The frame buffer controller has four interfaces, video input interface, video output interface, memory interface and processor interface. The circuit can input image data from a camera and store the frames in external DRAM. The circuit provides for external processor access to pixels in the frame buffer and for output of the frame or portions of the frame, as well as output of frames in a format of CRT display and external DRAM refresh.

15 Claims, 4 Drawing Sheets

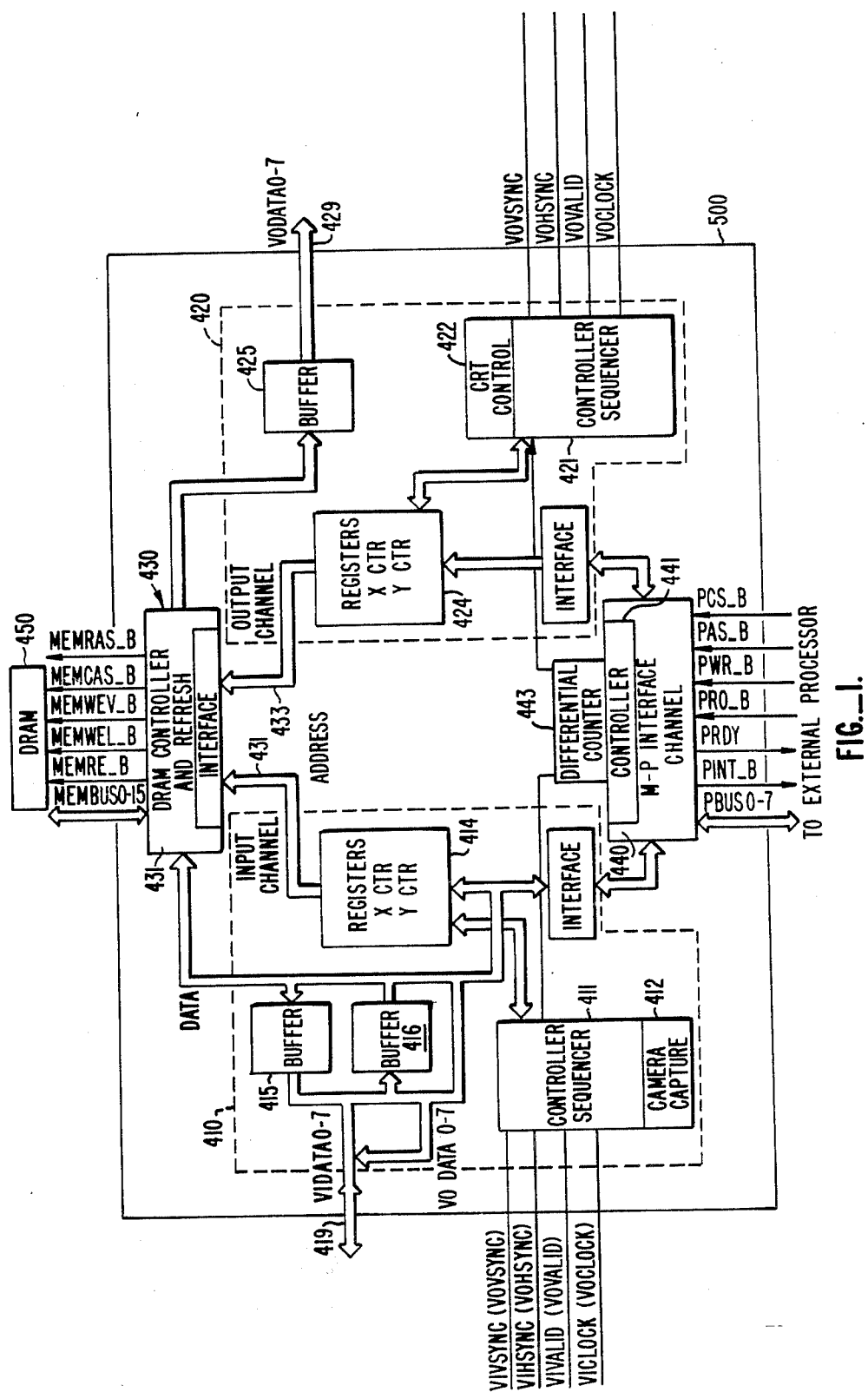
FIG._1.

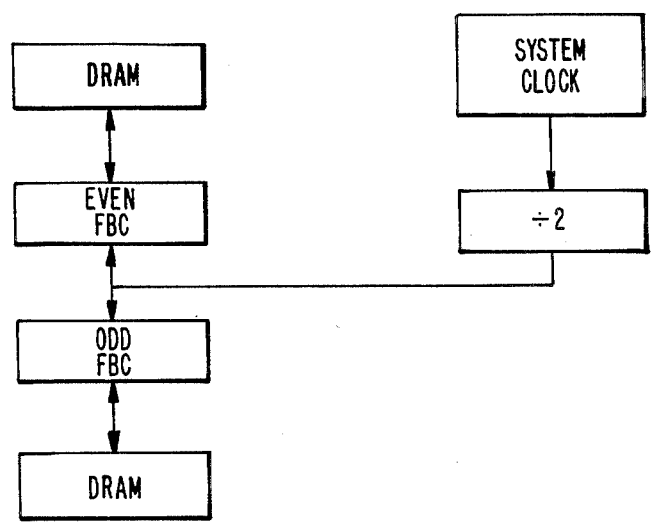
FIG._2.
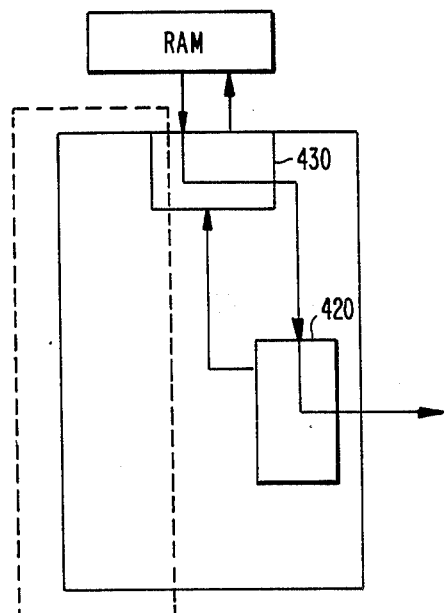
FIG._7.
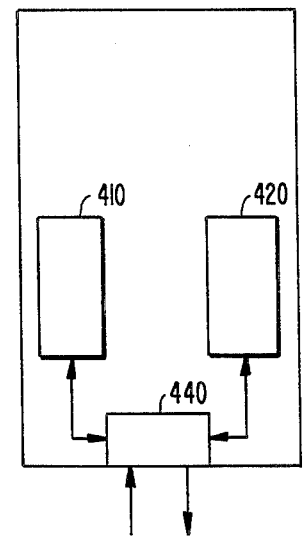
FIG._8.

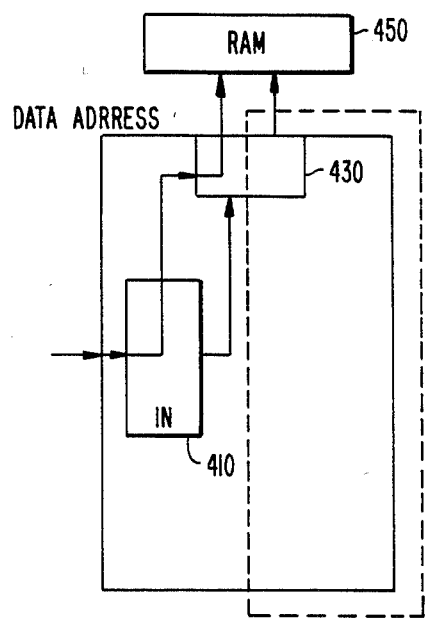
FIG._3.
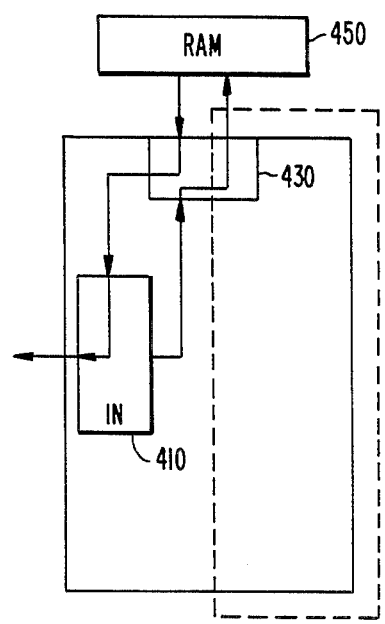
FIG._4.
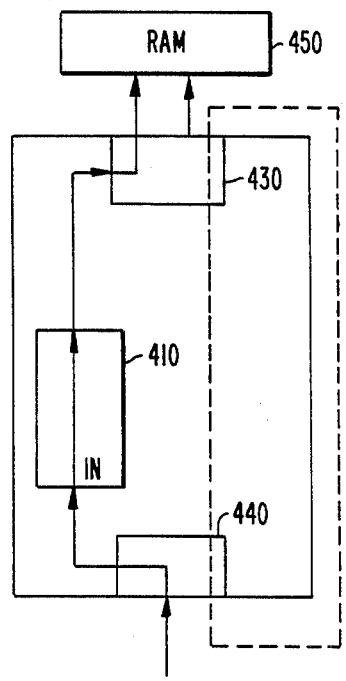
FIG._5.
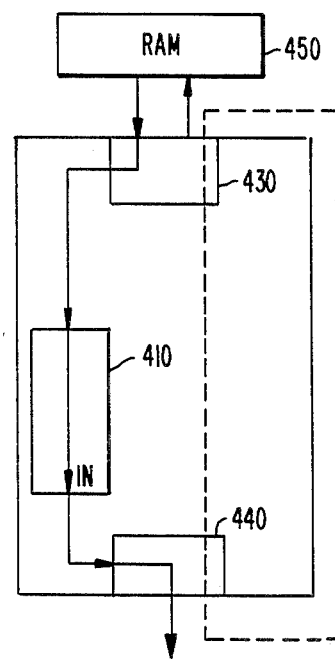
FIG._6.

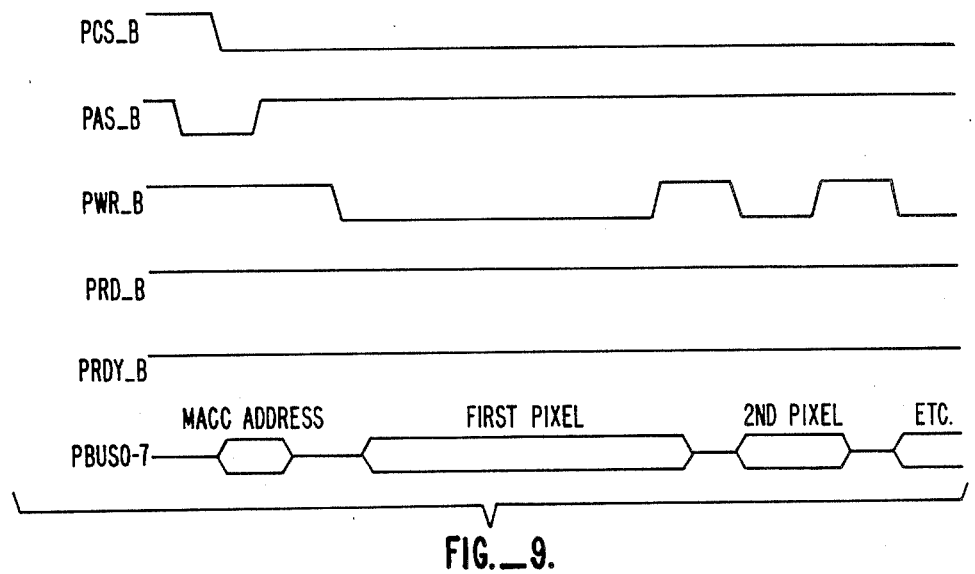
FIG._9.
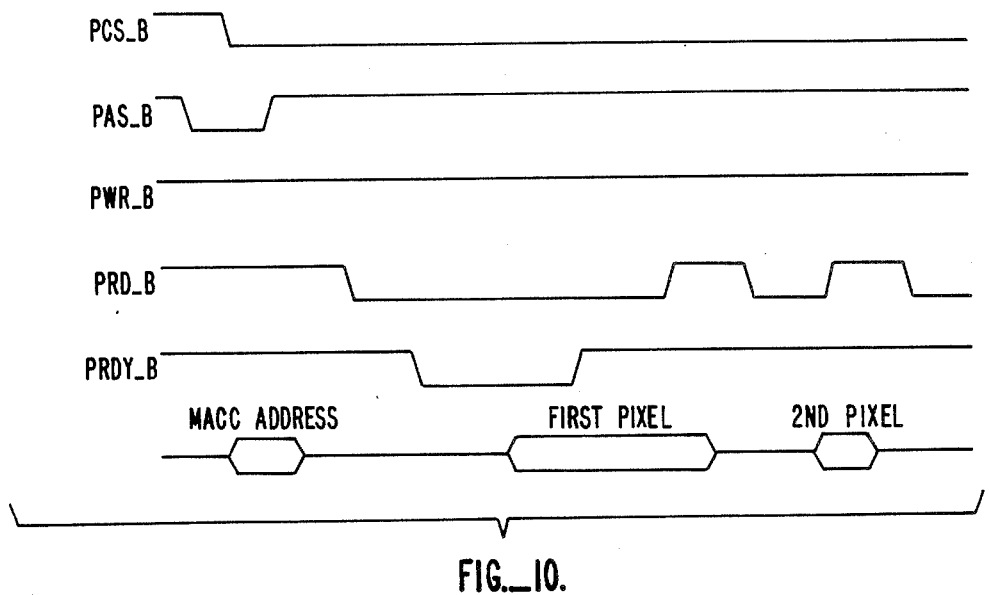
FIG._10.

VIDEO STREAM PROCESSING FRAME BUFFER CONTROLLER

This is a continuation of application Ser. No. 590,980, filed Mar. 19, 1984, now abandoned.

BACKGROUND

This invention relates generally to the field of video signal processing and pattern recognition, and more particularly to a system of video stream processing including a modular family of novel video processing subsystem modules using digital techniques to process images.

Image reconition techniques are becoming widely utilized to automate industrial and manufacturing processing applications. Among these are such applications as locating parts on a conveyor belt, verifying the presence of parts during assembly, locating landmarks or targets in aerial imagery, optical character recognition, and locating bonding pads on alignment masks on semiconductor chips. Further, the development and implementation of systems for the more complex real time image processing and pattern recognition tasks call for computational throughputs in excess of those possible utilizing prior art techniques. In addition, in many applications digital techniques are widely employed to process the images. However, due to the massive amount of data to be analyzed and processed in such digital systems, they are often slow and incapable of operating at standard video rates. One technique often utilized to alleviate this problem is the use of parallel processing. However, a number of constraints limit the use of this approach including, with the advent of VLSI techniques, the chip pin-out contraints.

SUMMARY OF THE INVENTION

The present invention is a frame buffer controller for storing a frame of an image in its original, intermediate, or final form in a frame memory. The frame buffer controller and frame memory itself form a frame buffer which can be used at various points in a visual signal processing system. The frame buffer controller has a video input interface, a video output interface, a microprocessor interface and a memory interface.

The processor interface provides control signals from an external processor to the input and output interfaces to control the flow of video pixel data. Both the input and output interfaces include buffers to allow translations between different numbers of data bits.

In the preferred embodiment, the input data is in an 8 bit format and two successive 8 bit chunks are stored in buffers so that a 16 bit format can be transferred to memory. Similarly, in the output interface, 16 bits from the memory are held in the buffer and transmitted to the output data line 8 bits at a time. This allows the input and output channels to alternate internally while appearing externally to be operating simultaneously. Thus, the advantages of a dual-ported memory are provided without the requirement of buying an expensive dual-ported RAM.

By disabling either the input or the output, pixel data can also be transmitted through the microprocessor interface by way of the disabled channel at the same time that pixel data is being transmitted through the enabled one of the input and output channels.

Each of the input and output channels is provided with a series of working registers with associated shadow registers. The working registers designate the appropriate addresses in the memory for input or output under the control of a controller sequencer. The use of shadow registers allows a processor to set up the values for a next frame at its leisure while a current frame is being input to or output from the memory.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

FIG. 1 is a detailed block diagram illustrating a specific embodiment of a novel video stream processing system frame buffer controller (FBC).

FIG. 2 is a block diagram illustrating a tandem operating configuration for the frame buffer controller of FIG. 4A.

FIG. 3 through 8 are a set of flow control diagrams showing data flow for various operational conditions of the frame buffer control.

FIGS. 9 and 10 are timing diagrams of a direct pixel Write and Read, respectively.

DETAILED DESCRIPTION OF THE PREFERRED EMBODIMENT

Referring now to FIG. 1, the interior detail of a frame buffer controller (FBC) 500 is shown. The FBC is utilized in conjunction with DRAM to form the frame buffers described hereinbefore. A video input interface channel 410 is programmably bi-directional, and can input or output VSP streams from DRAM. A VSP video output interface channel 420 can only output. A DRAM controller interface 430 provides bi-directional interface to a DRAM 450 where the data pixels are actually stored. A processor interface 440 provides a bi-directional interface with an external processor. Each of these four interface channels has a particular controller associated with it. The microprocessor interface 440 has a microprocessor interface control section 441, the output channel has got a complete output channel controller 421, 422, the input channel has got a complete input/output controller 411, 412, and the DRAM interface 430 has a DRAM controller including refresh control, 431, for communications with the DRAM 450. The interior detail of the channels include interfaces to the other interface channels with which they communicate. The input and output channels have data and address communications lines to the DRAM controller, and the input and output channels also have interface to the microprocessor controller. In addition, there are a number of registers in each of the input and output channels. There are a number of registers that control the sequencing of addresses to the DRAM 450 via the DRAM controller 430 to actually cause the windows of data to be stored or output. Each channel has a control sequencer 411, 421 to help in the sequencing of this control. The output channel also has a CRT controller section 422 that allows the VSP handshake to be modified to be compatible with a video standard, such as NTSC, PAL, etc. The CRT controller is programmable to provide any of those standards in terms of vertical and horizontal blanking signals.

Within the video input channel 410 there is camera capture logic 412. By programming some of the video input channel registers 414, the FBC can accept non-standard inputs (i.e. non-VSP protocol) via the video input interface. There is an extra boundary around which there is no information, which is the blanking information coming in. In addition, there may be other additional circuitry, on the outside of the FBC to condition a signal coming directly from a CRT, i.e. sync signals have to be stripped and converted into the handshake level signals. The function of the video input channel in its input mode consists of inputting pixel data and storing it into the memory 450. There are a number of registers 414, all of which can be preset up by the microprocessor via the microprocessor interface 440. The microprocessor can preempt whatever else the video input channel is doing and reset it. The microprocessor can preload and set up all the registers within the video input channel. Many of these registers are multiple bytes, and there are various convenient modes for step-loading successive bytes into the video input registers, as opposed to having to separately address each byte of the registers. Some are data registers; some are control registers; some are mode registers; some are address registers; some are interrupt registers. A detailed description of the FBC registers is provided elsewhere herein.

The microprocessor interface channel 440 interfaces to the video input and output channels are bidirectional. All of the registers 414 and 424 are set up by the microprocessor or via a control sequencer. To facilitate sequencing of image processing, most all the registers 414 and 424 have a shadow value register and a working copy value register. The microprocessor writes the next copy to the shadow value registers—the copies of the registers that are to be utilized during the next frame of processing. The microrpocessor has the entire current frame of processing to set up all the control information for the next frame. Upon completion of the current frame, the channel transfers the the shadow values into the working registers, and then proceeds to work with them. The microprocessor cannot directly access the working registers. This is important in order to be able to support asynchronous clocking to allow independence of clocks of both of the VSP inputs and outputs and of the microprocessor handshake.

The registers are described in detail elsewhere herein. However, the following description will describe the main function of the x and y counter registers. The x and y registers cause relative window addresses to be derived which are converted and sent out as the address information to the DRAM controller 430. It is the responsibility of the controller sequencer 411 within the video input channel 410 to start up the channel at the appropriate time as programmed by the microprocessor.

The control sequencer 411 responds to the set-up of the video input interface channel's registers 414. The microprocessor can cause the video input channel 410 to start, under the command of the video input control sequencer 411. The microprocessor interface 440 interconnects to the video input control sequencer 411, via the video input channel's registers 414. The control sequencer is instructed by the microprocessor when to start. Among other things, it can be instructed to continuously start at the beginning of all the successive frames, so it doesn't need any more control information. It can just run continuously. The control sequencer will cause the x and y counters to be loaded with appropriate initial values and set up the rest of the registers 414 to start, and then wait for the appropriate handshake to come in on the video input. When a valid beginning of frame comes in, the counters begin counting, which then starts sending addresses to the DRAM controller 430 and, simultaneously, causes the data values, as they come in, to be latched into the DRAM controller 430. The DRAM controller 430 buffers up several values before actually making a write to or doing a read from the DRAM memory 450.

When the current video input gets to the end of a particular line, this is indicated by the x-counter coming to the end of line value. There are different ways to implement this function. A separate counter can count how many pixels have passed so far, rather than trying to compare to the current x locations. At the appropriate time to load the x and y counters to initial values, a single address register can have the offset from one line to the next added to it, to get into the next window within the DRAM. This can happen when the control sequencer responds to the end of line handshake coming in from the VSP input. The control sequencer can then start writing the information of that line to the DRAM. In between the end of one line and the beginning of the next, the control sequencer 411 will force the processing to stop and in fact cause the video input channel 410 to be held inactive if any more data attempts to come in. The control sequencer 411 holds down the pixel pause line and sends a signal to DRAM controller 430 allowing it to do refresh. The control sequencer 411 takes into account how long the lines are, and how much RAM 450 there is, and how much time there is in between the lines, in a complex fashion, to try to minimize the amount of refresh for power consumption and overhead reasons yet still provide enough fresh for whatever the current requirements are.

The microprocessor loads a register 414, as discussed elsewhere herein which specifies the amount of RAM 450 the FBC 500 is addressing. The microprocessor also loads registers 414 to indicate what type of RAM is being used (e.g. 64K, 256K), characteristics for that type of RAM, and to tell what the clock speed is. All of the internal decisions as to how often refresh is needed depend upon the clock speed.

The discussion just given describes the implementation as shown in FIG. 3, which shows the input channel 410 acting as a unidirectional path to store the incoming data into the dynamic RAM 450. The data flow shown in FIG. 3 is for the video input mode.

The VSP handshake and control signals which are normally logically part of the VSP input coming in, are routed directly to the control sequencer 411. The camera capture logic 412 is melded into the control sequencer 411 as a type of control information in the preferred environment. The data input and output into the video input channel 410 is buffered 415, 416 once before going to, or from, the DRAM control 430 where there is further buffering, and at least initial latching. In fact, depending upon the pipeline, there actually may be a couple of different buffers. The video input channel buffers 415, 416 also function to buffer data input and output to the microprocessor interface 440, through multiplexers. As illustrated these buffers 415, 416, shown in the input channel 410, couple to the DRAM control, and couple to either the VSP input/output data or to the microprocessor input/output data.

Now referring to FIG. 4C, the flow control is shown where the video input is coming in from the VSP data stream, coming in through the input channel controller 410 into the DRAM controller 430 into the DRAM 450.

If the input stream was not coming from the VSP input, but rather coming from the microprocessor input, then the flow control is as shown in FIG. 5, where the data coming in through the microprocessor interface 440 couples through the input channel 410 and then from there to the DRAM controller 430 to the DRAM 450. Much of the sequencing and control, the counting, and so on, are performed the same way as described before for the input channel. The only difference is that there is no end-of-line or end-of-frame information coming from the microprocessor. Rather, the microprocessor preprograms the size of information, and the FBC sequences goes until it hits the programmed size limit.

Only one of the configurations 3-6 can be implemented at any given time because the video input channel 410 can only act in a unidirectional sense at any one time. The input channel 410 can only be inputting or outputting, and both of these modes can only talk to either the VSP input port or the microprocessor interface port at any given time.

The FBC VSP video input channel 410 can be used for output, as shown in FIG. 4. The control and sequencing information still comes from the control sequencer 411 in essentially the same way as previously described for the input mode of FIG. 3. The difference is that the FBC is doing reads from the RAM 450 as opposed to writes to the RAM. The registers 414, and counters therein, still perform in essentially the same way. The same registers and counters are utilized. That is why, in the illustrated embodiment, only input or output can be performed at any one time via the video input channel 410. For data output from the input channel 410, the data coming out from the RAM 450 is sent out via the DRAM controller 430 and then out the video input channel 410, and the handshaking configuration from the input channel 410 is now different because the FBC is master of the channel as opposed to the slave on the channel. The control signals lines, which for input mode, went into the control sequencer 411, are bi-directional, and in output mode, convert to output lines for VSP handshake as necessary, responsive to the control sequencer 411.

In a similar manner, as shown in FIG. 6, the RAM data can be output through the microprocessor interface channel 441 as opposed to being output via the video input channel 410. In all other ways, operation is nearly identical to that just described for the output mode of the video input channel 410. The main difference is that while the output data still gets buffered via the video input channel 410, instead of being latched out to the VSP video input port 419, it gets latched out via the microprocessor interface port 449. There are two unidirectional signals functionally replacing the pixel hold signal to the video input channel 410. One signal is from the microprocessor interface 440 to the input channel 410 to cause output to be frozen. The other signal is from the video input channel 410 to processor interface 440 indicating the output isn't ready. The microprocessor handshake to the FBC can indicate that the microprocessor has not yet requested the next byte of data, and can, via assertion of the pixel hold signal, force the input channel to hold.

The selection of which of the four modes of operation, FIGS. 3-6 is chosen is done under the control of the host microprocessor via the microprocessor interface 440 by an initial loading of the registers 414. The control sequencer 411 sets up which mode the video input is going to operate in. There is a configuration register and a control register that is written to by the microprocessor to select which of the four modes shown is being executed. The FBC registers 414 and 424 are described in greater detail below.

In FIGS. 3 and 4, the input channel is totally absorbed in reading or writing the data via the VSP input channel 410, and the microprocessor is not allowed during such read or write to get access to the pixel information. The processor cannot do that without waiting, or interrupting the channel and changing the channel mode, in essence aborting the previous channel mode. However, the microprocessor can read status registers in the input channel during such read or write as described with reference to FIGS. 3 and 4. The microprocessor can check status information, and can write the next values into shadow registers simultaneously while the video input channel 410 is performing input or output operations via the port 419.

The operation of the video output channel 420, as shown in FIG. 3, is analogous to that as described with reference to FIG. 4. The output channel 420 can extract data via DRAM controller 430 from the RAM 450, buffer the data via buffer 425, and send the data out the VSP output channel 420 via output port 420. The main difference between the video output channel 420 and the video input channel 410 is that the video output channel can only run in output mode. The output channel also has CRT control logic 422 not present in the input channel 410. The CRT control logic 422 includes an additional set of registers, beyond registers 424, and contain configuration information that allows the output channel 420 to synthesize the CRT control formats of a number of different international standards, as well as certain custom interface CRT standards of the newer, higher performance monitors that don't adhere to any particular standard. The CRT control registers convert normal VSP handshake as output from the control sequencer 421, into blanking signals, and vertical and horizontal blanking. Another not illustrated, color burst signals and equalization signals, can be internally or externally generated, where it is desirable to provide video output signals that are suitable for broadcast video applications.

Operation of the output channel 420, as illustrated in FIG. 7, is very similar to the way the input channel 410 performs as an output channel as shown in FIG. 4. The output channel 420 first has all of its register 424 and configuration information loaded by the microprocessor. The data flow during register 424 loading or reading by the processor is as shown in FIG. 8, where the microprocessor is shown communicating with the output channel. Once the output channel 420 is instructed to start operation, the output control sequencer 421 within the output channel 420 loads the initial x and y counts, and sends that information to the DRAM controller 430, which then reads in the first requested bytes of pixel data from the DRAM 450. The pixel data from the DRAM 450 is read in via the DRAM controller 430, is buffered and then sent out over the VSP output. At any point, because of the way the VSP handshake works, any VSP subsystems which are receiving the data from the output channel 420 can assert the pixel hold (i.e. the pixel valid signal can be kept high, which will cause the data output from channel 420 to pause until that VSP subsystem releases the pixel hold, indicating it is ready to proceed). The output channel control sequencer 421 will respond to the pixel hold information so as to freeze the functioning of the output channel 420 for the moment, and will hold the data until the asserting VSP subsystem or processing element is ready to proceed and accept further data. There is no loss of data and no malfunction of operation of FBC caused by the hold function either on input or output. The DRAM controller 430 monitors refresh, and if necessary to preserve data integrity, will perform refresh at any point in a line, without causing loss of data or synchronization. The VSP protocol is defined such that any pausing applies to the next pixel and not to the current pixel. That greatly simplifies pipelining and concerns about loss of data.

The output channel 420 control registers 424 have end of the line limits that cause the DRAM controller 430 to go into refresh mode at end of each line, and which provide a signal to the next VSP subsystem or processing element coupled to the output port 429, indicating that there is no data for the moment. The output channel 420 has complete control over the VSP handshake lines and puts appropriate information on them at the appropriate times. The output channel 420 then increments the y counter, and loads the changed address from registers 424 into the DRAM controller 430 to start the fetching for the next set of addresses for the next line of data for the current window or frame from the DRAM 450. This will proceed until the end of frame, at which point the end of frame information will be sent out on the VSP control lines. The output channel 420 can then optionally raise the interrupt line to the microprocessor, at end of frame. The same is true in the input channel 410; it also can interrupt the microprocessor. An interrupt could also be triggered by an end of line condition, but this can be functionally achieved by making a frame that is only one line high.

The interrupt is maskable within the microprocessor interface 440, and within the input and output channel registers 414 and 424 separately. The FBC's operation can be programmed for set up such that when an end of frame occurs, the output channel 420 takes the next generation of register 424 contents as loaded by the microprocessors during the processing of the previous frame, and loads those into its working registers and proceeds with its processing. The interrupt generates a control signal to the microprocessor, which can indicate that the output channel 420 is loading the next level of sequencing commands from the shadow registers to the working registers and is processing them. The processor can then start loading the next set of commands into the shadow registers. There is a handshake protocol which allows the microprocessor via the microprocessor interface 440 to inform the output channel 420 that the processor has not yet finished writing to all the necessary registers 424, so as to inhibit the output channel 420 from immediately taking the new values as working values. Analogously, the same interrupt and transfer protocol exists for the input channel 410. This is the part of the general register (414 and 424) to microprocessor interface 440 which can be utilized in the FBC 500 as well as to a number of other VSP subsystems. In the illustrated embodiment, the FBC 500 is a single VLSI integrated circuit.

One of the fundamental operations that must be performed in doing graphics and image processing in frame buffers is that of dual porting memory in some way. It is so fundamental that some manufacturers have gone to the exteme of dual porting the RAMs themselves, which is relatively expensive. The FBC 500 performs the same function in conjunction with standard DRAM.

The FBC directly controls the DRAMs using nibble mode for very high throughput and performance. In a preferred embodiment, as shown in FIG. 2, the configuration is such that every DRAM cycle, the FBC does a double pixel-wide access. Thus, a four cycle nibble mode access transfers 8 bytes of information via the controller 430 on every cycle. Every external memory cycle is dedicated alternatively to the input channel 410 and the output channel 420 in order to perform the interleaving and to avoid conflict between the input channel 410 and output channel 420. There is sufficient bandwidth such that both channels can be running at full speed, inputting and outputting, or outputting and outputting. There is no delay because each channel, 410 and 420, access is only 8 bytes wide, while the memory interface is 16 bytes wide. Alternatively, the microprocessor can be reading or writing the DRAM at full speed through its 8 bit interface 440, while the FBC is also outputting at full speed to the output channel 420. Usually, when outputting to a CRT, it is absolutely essential to be able to keep the video appearing on the CRT while doing anything else to the memory. The timing cannot wait until the blanking information at the end of the line or the end of the frame to be able to work with pixels. Conventional single ported DRAMs can be utilized with the FBC, and by the above described techniques, effective dual porting can be achieved using standard off the shelf RAMs, with significant cost savings over the use of dual-port RAMs.

In addition to the dual port operation of the RAMs, the FBC also provides CRT control, sequence control, and window control. The only penalty paid for the use of nibble mode and of always interleaving is that there is latency in terms of initial DRAM access. For VSP input and output, latency is no problem, because everything is pipelined. However, the microprocessor often accesses the RAM a single pixel at a time to read or write to RAM. The worst case would be that the processor would have to wait 8 VSP clock cycles in order to be able to get at the desired information, which is 800 nanoseconds in the illustrated embodiment. If higher throughput RAM is coupled to an FBC, the delay can be reduced. However, in most applications, the microprocessor will transfer out a portion of the memory at a higher rate and deal with it internally via its own memory channel. In this case latency is not a problem. Modern microprocessors often have the identical latency problems, because they often utilize nibble mode with RAM. This can be solved by reading into or writing into their own cache memory. Thereafter, operation is from the cache. When the microprocessor wants a single access, it accesses an entire window, which then gets loaded into the cache of the microprocessor. Further access by the microprocessor occurs by its accessing its own cache. In fact, it is an established practice for processors to get effectively fast access to slow start-up memory via caching.

Within graphics applications it is often desirable to utilize read-masks and write-masks on pixels. When accepting pixels in or sending pixels out, it may be desirable to zero out certain bits within pixels, i.e. just ignore certain bands of information. This can be accomplished via a write mask or read mask in the FBC. Alternatively, this can be easily performed externally via a lookup table. Thus, the system can selectively ignore certain bands of pixel data, and this is quite useful in terms of showing different layers in CAD applications, for viewing multiple sources of data, and for multiplexing additional information or pictures onto a screen. Utilizing this technique, the system an write a different layer of an application on the screen without disturbing other layers in between. This is very useful in CAD. Because of pin limitations, in the preferred embodiment, there may be only two write-strobes out of the RAM interface 430, allowing selective write to either of two pixels. Since two pixels are written at one, each bank of memory should be separately controllable to be able to get access to individual pixels. A mask can be provided to allow access to a single bit within a window, such as to selectively write only certain bits within the boundaries defined by the FBC. Alternatively, this bit mask could be added via a single simple external latch that is written to by the microprocessor. However, a read mask does not require any additional pins, and can be supplied internally to the VSP output data before the data is output from the chip. There are many other graphics applications where the FBC is useful.

The FBC has the capability, via loading the zoom registers within registers 414 or 424, to automatically pixel replicate the image it is sending out. This allows "blow up" of the individual pixels out of the memory 450 to fill many physical pixels on a display. This is quite useful in many applications when trying to see fine details of data. It is particularly useful when actually viewing live digitized data at zoomed resolution.

The zoom output is accomplished by the FBC 500 reading pixel data from that buffer 425 under the control of the control sequencer 421 of the output channel 420, which is responsive to the instructions with the processor loaded into the zoom register of the output channel. These instructions specify, to the control sequencer 421, how many times each pixel is to be output from the buffer 425 before the next pixel data is loaded into the buffer 425.

The zoom function provides pixel replication by any integral multiple. In the illustrated embodiment, a pixel can be sent out 1, 2, 3, 4, up to 256 times, for x zoom. For y zoom, which is independent, the system retransmits a whole line (i.e. decides not to add an offset into the y-counter at the end of the line). There is a another way to achieve the same functionality. Sometimes there is a need to process the same line several times before going on. There is an end of line protocol provided for by VSP protocol as described herein. The end-of-line signal is feedback information, coming back down the chain of output, to the FBC, which indicates to the FBC to repeat output of the line, and to not increment the y-counter to go to the next line. The FBC will go into the refresh mode, and then start transmitting in the same line.

For both the video input channel 410 and the video output channel 420, the respective control sequencer 411, 421, interconnects to all other blocks within the respective channel. In the illustrated embodiment, some of the CRT control 422 is merged into the video output channel control sequencer 421.

In the illustrated embodiment, the Frame Buffer Controller operates in a Vision Stream Processing environment handling video information digitized with up to 8 bits. The basic functions include:

1. Input a picture (frame) from some video source, such as a camera.
2. Store the frame(s) in up to an 8K×8K×8-bit pixel buffer (external DRAM).
3. Allow microprocessor access to pixels in the frame buffer.
4. Output the frame or portion (window) to some video destination.
5. Special case CRT mode: Output frames in CRT format direct to CRT.
6. Keep the external DRAM refreshed.

The FBC has four interfaces: video input interface, video output interface, memory interface and microprocessor interface. The video input interface may be connected to any video source, such as the digitized output from a camera, or the output from some other VSP Subsystem. In the illustrated embodiment, the FBC video input interface can also function, alternatively, as a video output interface. The video output interface may be connected any video destination, such as a CRT, or to the input of some other Vision Processing System product. The memory interface may be connected directly to 64K or 256K dynamic RAM (with nibble mode capability) or to a memory system (with nibble mode capability). The microprocessor interface is suitable for connection to any modern microprocessor, such as the 16000 family or the 68000 family. The FBC is fully programmable and provides the functions and features required of a digital image memory subsystem. In a preferred embodiment, the FBC is also scan testable.

The FBC in conjunction with external dynamic RAM (DRAM), as illustrated in FIGS. 4A and 4B can provide:

1. Up to 8K×8K×8 bit pixel storage usable as one large, or in smaller images.
2. Up to 10 MHz video pixel rate when operating with a single FBC.
3. Up to 20 MHz video pixel rate when 2 FBC's are used in Tandem mode.
4. Asynchronous interfaces. Pixel rate in need not match pixel rate out.
5. Video frame may have two (2) interlaced fields, for input and output.
6. Video output programmable horizontal and vertical sync pulse delay and width.
7. Microprocessor interface includes direct memory access to frame buffer memory.
8. Multiples of 8 bits/pixel, by vertically paralleling multiple FBC, synchronizing the FBC's to run in lock step by commoning the VSP handshake inputs for compatibility with asynchronous pixel inputs. This paralleling is independent of but compatible with tandem mode operation.

The FBC can work with packed, as well as unpacked, binary pixel data, providing compatibility with gray scale operations and bit mapped graphic output devices. Packed binary pixel data refers to packing 8 binary pixels into a single byte of VSP data.

The FBC video input and output ports can deal with non-standard VSP signal streams. The VSP input port can accept the output from an A to D with sync stripped so that it can act as the first level transformation device for accepting and buffering video input. The VSP input port can also act as a bi-directional port, providing for an output port. The VSP output port can either feed to a normal VSP stream, including handshake, or can utilize two of the handshake signals in a mode as horizontal and vertical sync-type signals to provide for direct output from the FBC to a display device, such as a CRT. The input to the VSP input port of the FBC can only be stored to the RAM, that is written to the RAM. The RAM contents can be output either through the VSP output port, or through the VSP input, when acting as an output port, or back to the microprocessor interface. Data can be input and written to RAM, and the FBC chip has intelligence and logic to prevent conflicts when accesses are getting too close physically. Additionally, the FBC can be outputting simultaneously from different RAM locations, via both the output port and the input port acting as an output port. The microprocessor can interface with the FBC internal registers, and other internal functions of the FBC, but cannot communicate to the RAM at the same time as the input port is communicating to the RAM. The microprocessor can both read to and write from the RAM. The FBC provides the abstraction of taking an array of DRAM and doing stream to rectangle and rectangle to stream conversion of data going in and out of that RAM.

Although the video input interface is designated as an input, as it is for most applications, it may be programmed as a video output.

The functions of the FBC signals are described for each interface.

The naming convention used hereafter shall be such that a_B postscript indicates a negative-true (asserted-low or active-low) signal. Data on all busses is positive-true. Data on the video data busses indicates pixel intensity, where 0 represents minimum intensity (dark) and 255 (for an 8-bit pixel) represents maximum intensity (bright). However, the FBC does not do any interpretation of pixel intensity.

A description of the signal functions for each of the four major interfaces for the FBC shall now be described.

| Name | I/O | Function |
|---|---|---|
| | | Video Input Interface. |
| VIVSYNC | IN/OUT | Video Input Vertical Synchronization: Active-high, may be programmed as: 1. Frame Valid input. The low-high transition indicates start of frame. 2. Frame Request output. For interlaced input the FBC recognizes the low-high transition of VIVSYNC pulse as the start of field pulse. If this is detected coincident with the low-high transition of VIHSYNC then this is recognized as an odd field for interlaced frames; otherwise this is recognized as an even field. (Edge detection is synchronized with VICLOCK). |
| VIHSYNC | IN/OUT | Video Input Horizontal Synchronization: Active-high, may be programmed as: 1. Line Valid input. 2. Line Request output. For interlaced input the FBC recognizes the low-high transition of VIHSYNC pulse as the start of line. |
| VIVALID | IN/OUT | Video Input Valid: Active-high, indicates that data on the VIDATA bus is valid in the following cycle, and may be programmed as: 1. Input only. 2. Bidirectional, when pulled down, no further pixels are transferred. |
| VICLOCK | IN/OUT | Video Input Clock: Positive-edge, indicates that new data is present on the VIDATA bus. (Valid only after VIVALID as asserted). This must be a CONTINUOUS clock. May be programmed as: 1. An input signal. 2. An output signal. |
| VIDATA0-7 | INPUT | 8-bit Video Input Data Bus: Active-high, represents true data which may be clocked by the positive edge of VICLOCK. (Valid only after VIVALID was asserted). May be programmed as: 1. An input bus. 2. An output bus. |

The video input interface, although normally used to input data, may be programmed to output data. In such a case all the signals on this interface function as with the video output interface (except CRT mode) described below.

| Name | I/O | Function |
|---|---|---|
| | | Video Output Interface. |
| VOVSYNC | IN/OUT | Video Output Vertical Synchronization: Active-high, may be programmed as: 1. Frame Valid output. The low-high transition indicates start of frame. If pulled low then the frame is aborted. 2. Frame Request input. In the special case CRT mode: VOVSYNC is the vertical synchronization pulse with programmable delay to start, width and delay after end. If this is coincident with the low-high transition of VOHSYNC then this is an odd field for interlaced frames; otherwise |

-continued

| Name | I/O | Function |
|---|---|---|
| | | this is an even field. |
| VOHSYNC | IN/OUT | Video Output Horizontal Synchronization: Active-high, may be programmed as: <br> 1. Line Valid output. <br> 2. Line Request input. If this remains asserted after the end of the line, then the same line is repeated. <br> In the special case CRT mode: VOHSYNC is the horizontal synchronization pulse with programmable delay to start, width and delay after end. |
| VOVALID | IN/OUT | Video Output Valid: Active-high, indicates that data on the VODATA bus is valid in the following cycle, and may be programmed as: <br> 1. An output signal. When pulled down, no further pixels are transferred and the data bus (VODATA0–7) enters the tri-state condition. <br> 2. An input only signal. |
| VOCLOCK | IN/OUT | Video Output Clock: Positive-edge, indicates that new data is present on the VODATA bus. (Valid only after VOVALID was asserted). This must be a CONTINUOUS clock. May be programmed as: <br> 1. An output signal. <br> 2. An input signal. |
| VODATA0–7 | OUTPUT | 8-bit Video Output Data Bus: Active-high, represents true data which maybe clocked by the positive edge of VOCLOCK. (Valid only after VOVALID is asserted). |
| | | Microprocessor Interface |
| PBUS0–7 | IN/OUT | 8-bit Microprocessor Bus: Active-high, represents <br> 1. True address information input, clocked by the positive edge of one or more address strobes (PAS__B). <br> 2. True write data input, clocked by the positive edge of the write strobe (PWR__B). <br> 3. True read data output, valid by the end of the read strobe (PRD__B). |
| PCS__B | INPUT | Microprocessor Interface Chip Select: Active-low, indicates that this chip is selected and that the control signals PAS__B, PWR__B and PRD__B are valid. |
| PAS__B | INPUT | Microprocessor Interface Address Strobe: Active-low, indicates that the information on the microprocessor bus is valid address information. For access to the internal registers of the FBC a single byte address is sufficient. For direct pixel access to the frame buffer video memory, a 4 byte address is required. PAS__B is asserted (low) for each address byte transferred. |
| PWR__B | INPUT | Microprocessor Interface Write Strobe: Active-low, indicates that the information on the microprocessor bus is valid write data (provided PCS__B is asserted). |
| PRD__B | INPUT | Microprocessor Interface Read Strobe: Active-low, indicates that the FBC may present read data on the microprocessor bus. |
| PRDY | OUTPUT | Microprocessor Interface Ready Signal: Active-low, indicates that the FBC is not ready to proceed with the requested access. PRDY may go low some time after the last (fourth) address strobe (PAS__B) in cases where the video memory is not available, as for example during a refresh cycle. PRDY goes high when the access may proceed. |
| PINT__B | OUTPUT | Microprocessor Interface Interrupt Signal: Active-low, indicates that a requested status, such as end of frame, has been reached. PINT__B is released when the condition is acknowledged or masked. |

| | | Memory Interface |
|---|---|---|
| Name | I/O | Function |
| MEMBUS0–15 | IN/OUT | 16-bit Memory Bus: Active high represents: <br> 1. Block address (MEMBUS8–15) and Row address (MEMBUS0–7) when the row address strobe (MEMRAS__B) goes low. MEMBUS15 asserted when MEMRAS__B goes low indicates that a refresh cycle is commencing and that all RAS__B lines to all DRAM parts must be asserted. <br> 2. Column address (MEMBUS0–7) when the column address strobe (MEMCAS__B) goes low for the first time after MEMRAS__B goes low. |

-continued

Memory Interface

| Name | I/O | Function |
|---|---|---|
| | | 3. Write data when the write enables go low (MEMWEU_B, MEMWEL_B) and for 3 following column address strobes (MEMCAS_B). Thus 16-bit words, or 8 bytes, may be written in one memory cycle. |
| | | 4. Read data input when the read enable (MEMRE_B) is asserted (low) for four successive column address strobes (MEMCAS_B). Thus 416-bit words, or 8 bytes, may be read in one memory cycle. |
| MEMRAS_B | OUTPUT | Memory Row Address Strobe: Active-low, determines the duration of the access to dynamic memory and the negative edge indicates that the row address is present on the bus (MEMBUS0-7). |
| MEMCAS_B | OUTPUT | Memory Column Address Strobe: Active-low, determines the duration of each of 4 accesses to dynamic memory with nibble mode capability and the first negative edge indicates that the column address is present on the bus (MEMBUS0-7). |
| MEMWEU_B | OUTPUT | Memory Write Enable Upper: Active-low indicates that data on the upper half of the bus (MEMBUS8-15) is write data to be written to memory during the current column access. For the first column access the negative edge of MEMWEU_B indicates that the write data is valid on the bus. For 3 following write accesses, MEMWEU_B remains asserted and data is valid on the 3 following negative edges of the column address strobe (MEMCAS_B). |
| MEMWEL_B | OUTPUT | Memory Write Enable Lower: Active-low, indicates that data on the lower half of the bus (MEMBUS0-7) is write data to be written to memory during the current column access. For the first column access the negative edge of MEMWEL_B indicates that the write data is valid on the bus. For 3 following write accesses, MEMWEL_B remains asserted and data is valid on the 3 following negative edges of the column address strobe (MEMCAS_B). |
| MEMRE_B | OUTPUT | Memory Read Enable: Active-low, indicates that the memory bus (MEMBUS0-15) output drivers are in tri-state so that read data presented on the bus (MEMBUS0-15) may be input to the FBC. |

In addition to the four major interfaces of the FBC, there is also an interface for input of power, ground, system clock, and test mode select. The system clock input is referred to mnemonically as SCLK, and for the illustrated embodiment is a continuous clock from 12 MHz to 30 MHz.

Most vision systems include as an integral part the "Frame Buffer", as shown in FIGS. 1-8, a large digital memory used to store the desired image responsive to a Frame Buffer Controller (i.e. FBC). In a graphics system, the image may have been computer generated by some mathematical simulation. However, in those applications where the image is "real", the image stored in the Frame Buffer comes directly from a camera (after digitizing) or some other type of light sensitive transducer. A vision stream processing system may require a number of frame buffers as partly processed images are passed down the pipeline stream.

The Frame Buffer Controller meets these requirements by interfacing between the video interfaces and controlling external dynamic memory (DRAM). If the minimum number (16) of 64 K DRAMs are used, 128 K (8-bit) pixels may be stored. This is equivalent to two images of 256×256 pixels. If the maximum number (2048) of 256 K DRAMs are used, 64 M (8-bit) pixels may be stored. This is equivalent to an image of 8K×8K pixels.

As shown in FIG. 2, the maximum amount of 2048 memory devices is obtained by using 2 FBCs in tandem each controlling 8 banks of 128 DRAMs.

The FBC can store one image up to the size of external DRAM attached or it can store multiple images of smaller size. The FBC can be used to "grab" one frame from a video source, such as a camera, and then repeatedly output that frame to some video destination, such as a CRT. Non-standard video input can be converted to standardized vide output, and vice versa, by the FBC. The FBC can continuously "grab" multiple frames, storing them in the same part of memory, but overlaying as each new frame enters. Again this frame area may be repeatedly output, possibly with entirely different characteristics such as frame rate, pixel rate, line length, frame length, and interface.

The video source may supply frames in a two field interlaced format. The FBC de-interlaces and stores the frame in continuous memory locations. In the special case CRT mode, the output may be interlaced and the necessary synchronization pulses are provided by the FBC to directly drive a CRT or equivalent display.

The FBC can work with sub-images. The FBC can output a rectangular "window" from within the stored frame. Any window from 1×1 up to the full frame may be specified. Also the FBC can input a rectangle window within a previously stored image.

The normal orientation for frames is the standard raster format, namely, start at the top left, scan across lines from left to right, and down successive lines from top to bottom. The FBC can be programmed to input or output frames in any of the three other combinations by scanning across the lines from right to left, or up successive lines from bottom to top. All of these combinations operate at the maximum data rate across the line (uninterrupted), with some overhead used between successive lines, for refreshing memory and other purposes.

A further option, "sideways" permits four more combinations of scanning the frame. The external memory is organized to give maximum efficiency to the normal scan across the line. However "sideways" is heavily penalized for going "across the grain" and there may be a significant delay (several pixel clocks) between each valid pixel. Sideways permits input or output scan up or down the frame accessing pixels in the same column and then accessing successive columns across the frame, from left to right or from right to left.

There are a number of interface registers in the FBC which can be loaded or read by the microprocessor. In addition the FBC includes working registers, which cannot be accessed by the microprocessor, and which duplicate most of the interface registers accessible by the microprocessor. The FBC uses the working registers to process a given frame while the processor may load the equivalent interface register in preparation for the subsequent frame. The contents of each interface register are transferred to the working equivalent under the control of a semaphore handshake mechanism between the microprocessor and the FBC. Since the FBC handles the video input interface entirely independently from the video output interface, there is a separate set of handshake flags for each of these.

tandem mode, valid video data is taken (or sent) alternately from (to) the two FBC's. Each FBC must be told whether it is the ODD or EVEN device. Valid pixels are counted from the first valid pixel after VSYNC. All odd pixels are stored in the ODD FBC and even pixels are stored in the EVEN FBC.

In order to support video input data from digitizing hardware from a camera in CRT format, and also to support video output data to hardware driving a CRT, the general video interface is modified, when CRT mode is programmed, to support the special case CRT format. The NTSC standard, the PAL standard, and others, can be supported by appropriate programming of the CRT format parameters.

In certain applications, especially where the FBC is used within a pipelined loop of VSP elements, it may be desirable to prevent an incoming frame from overwriting an outgoing frame. A differential counter 443 is present on the FBC for this purpose. When enabled, the differential counter is incremented by each VOHSYNC and is decremented by each VIHSYNC. While the differential counter is zero, the input interface is disabled by forcing VIVALID low. When the differential counter is non-zero the input interface is enabled. After the end of the output frame the input interface is enabled regardless of the count. At the end of the input frame the counter is reset. This facility operates only on a frame by frame basis, that is, both frames must end before new frames may begin and both frames must contain the same number of pixels per line.

There are a number of addressable registers associated with each video interface and also with the memory and microprocessor interfaces.

| VIDEO INPUT INTERFACE REGISTERS |
| --- |
| Video Input Control Register |

| 7 | 6 | 5 | 4 | 3 | 2 | 1 | 0 |
|---|---|---|---|---|---|---|---|
| DIFF | CONTIG | MULT | EOF | MASK | END | START | NEW |

| | | |
|---|---|---|
| NEW | | Internal flag, set by the positive edge of VIVSYNC. Reset by the end-of-frame. |
| | Load 0 | No effect. |
| | Load 1 | If BUSY=1 then wait until end-of-frame. When BUSY=0 copy NEW registers to working registers. |
| | Read 0 | NEW registers have been copies to working registers. |
| | Read 1 | Waiting for end-of-frame. |
| START | Load 0 | No effect. |
| | Load 1 | When NEW=0, START after next positive edge of VIVSYNC. |
| | Read 0 | Indicates 1st pixel in frame detected. |
| | Read 1 | Waiting for 1st pixel after START. |
| END | Load 0 | No effect. |
| | Load 1 | If END=1 then reset END, cancel interrupt. If EOF and BUSY then abort, stop video input, reset BUSY |
| | Read 0 | End of frame/line not yet detected. |
| | Read 1 | End of frame/line detected. Interrupt if not masked. |
| MASK | 0 | Enable END to cause interrupt. |
| | 1 | Mask END from interrupt. |
| EOF | 0 | End-of-line causes END. |
| | 1 | End-of-frame causes END. |
| MULT | 0 | Stop after next end-of-frame. |
| | 1 | Input Multiple frames. |
| CONTIG | 0 | Multiple frames use same START ADDRESS. |
| | 1 | Multiple frames use contiguous start addresses. |
| DIFF | 0 | Input independent from output. |
| | 1 | Enable differential counter mechanism. |

As shown in FIG. 2, two FBC's can be used together in tandem mode, effectively doubling the FBC throughput rate. Thus, where a single FBC's throughput is 10 MHz, to facilitate a system data throughput of 20 MHz, two FBCs are used together in tandem mode. When in The Input Control Register (ICTL) has immediate control over the operation of the video input. The NEW, START and END flags are used for the handshake between the processor and the video input interface. Each of these flags has a different significance when the ICTL is loaded, from when it is read. A load with any handshake flag reset has no effect, allowing the other flags to be used and to be located in the same register.

The normal sequence for this handshake, starting from idle, and for example with multiple frames, is as follows:

1. Processor loads appropriate registers.
2. Processor loads control register with NEW=1 and START=1. (also MULT=1).
3. FBC copies new registers to working registers.
4. FBC resets the NEW flag.
5. FBC starts looking for the next positive edge of VIVSYNC.
6. Processor reads control register and checks NEW=0.
7. Processor loads appropriate registers for next frame.
8. Processor loads control register with NEW=1.
9. FBC inputs complete frame.
10. FBC copies new registers to working registers (since NEW is set).
11. FBC resets the NEW flag.
12. FBC sets the END flag and may interrupt the processor.
13. FBC starts looking for the next positive edge of VIVSYNC.
14. Processor reads control register and checks END=1.
15. Processor loads control register with END=1.
16. Repeat steps 6 through 15 until last frame.
17. Processor loads control register with MULT=0 for last frame.
18. Repeat steps 6 through 15 for last frame.

The FBC requires a finite number of system clock cycles (SCLK) from the time that NEW is set until the FBC can start to process the next image. The FBC indicates its progress with the NEW and START flags which may be read by the processor.

Video Input Configuration Register

| 7 | 6 | 5 | 4 | 3 | 2 | 1 | 0 |
|---|---|---|---|---|---|---|---|
| FORCE | SIDEW | ILACE | OUTPUT | VSYNC | HSYNC | VALID | CLOCK |

| | | |
|---|---|---|
| CLOCK | 0 | VICLOCK is an input |
| | 1 | VICLOCK is an output at 1/3 SCLK. |
| VALID | 0 | VIVALID is an input, but may output a force LOW. |
| | 1 | VIVALID is an output, but must detect when forced LOW. |
| HSYNC | 0 | VIHSYNC is an output, but may output a force LOW. |
| | 1 | VIHSYNC is an output, but must detect when forced LOW. |
| VSYNC | 0 | VIVSYNC is an input, but may output a force LOW. |
| | 1 | VIVSYNC is an output, but must detect when forced LOW. |
| OUTPUT | 0 | The video input interface operates as an input interface. |
| | 1 | The video input interface operates as an output interface. |
| ILACE | 0 | Input is non-interlaced video. |
| | 1 | Input is two-way interlaced. |
| SIDEW | 0 | Input is normal raster scan, successive pixels in a line. |
| | 1 | Input is sideways, successive pixels in a vertical column. |
| FORCE | 0 | Input is from the video input interface. |
| | 1 | Input is from the FORCE PIXEL register. (The appropriate clocks are generated internally). |

The Input Configuration Register (ICFG) does not have an immediate effect. Only when it is copied into the working copy of this register, under the control of NEW and BUSY, do the bits in this register have effect. A read from this register reflects the contents last loaded into the register, not the contents of the working copy.

Video Input Force Pixel

| 7 | 6 | 5 | 4 | 3 | 2 | 1 | 0 |
|---|---|---|---|---|---|---|---|
| | | | INPUT FORCE PIXEL (IPIX) | | | | |

The Input Force Pixel is 8 bits held in a one byte register. The working copy of the Force Pixel determines the constant pixel value written to each location within the window when the Force Pixel flag is set in the Input Configuration register. The window is the complete frame as specified by the Start Address, Pixels per Line, Line Offset and Lines per Frame, although this may be a window within an image stored in the frame buffer. This facility is in fact a simple rectangle fill.

Video Input Start Address.
INPUT START ADDRESS BYTE 3 (ISA3)

(D2)

| 23 | 22 | 21 | 20 | 19 | 18 | 17 | 16 |
|---|---|---|---|---|---|---|---|
| | | | INPUT START ADDRESS BYTE 2 (ISA2) | | | | |

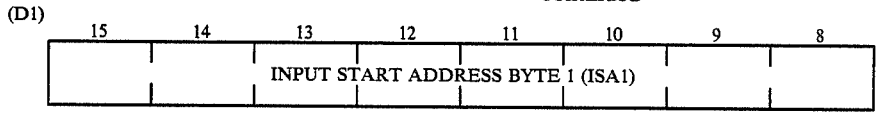

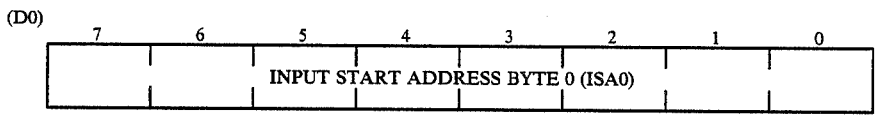

The Input Start Address is 25 bits held in a four byte register. Bits 25 to 31 of this register are dummy locations and the values read back from these bits are indeterminate. The addresses of these four registers within the FBC are consecutive, with byte 0 having the lowest address, to facilitate loading. The working copy of the start address determines the location in the frame buffer memory where the first pixel in the frame is to be written. The start address need not be on an 8-pixel boundary. When the input is to be written into a window within a previously stored frame, the start address may be anywhere within that frame.

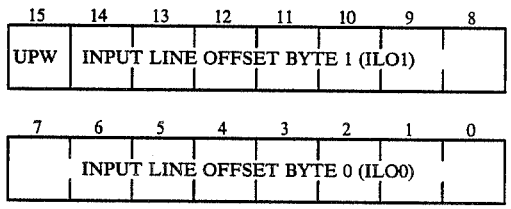

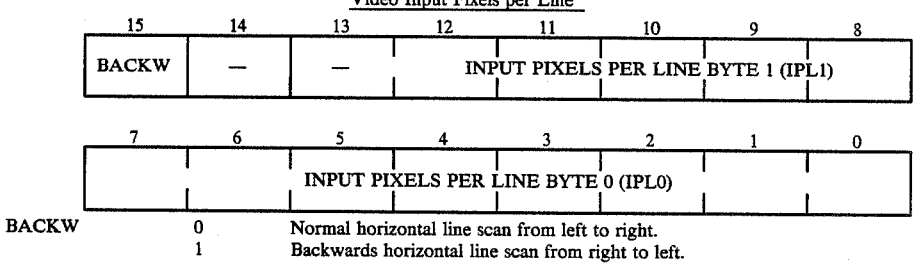

| BACKW | 0 | Normal horizontal line scan from left to right. |
|---|---|---|
| | 1 | Backwards horizontal line scan from right to left. |

| OPW | 0 | Next line start = Current line start + Line Offset |
|---|---|---|
| | 1 | Next line start = Current line start − Line Offset |

The Input Pixels per line is 14 bits held in a two byte register. Bits 13 and 14 of this register are dummy locations and the values read back from these bits are indeterminate. The addresses of the two byte registers within the FBC are consecutive, with byte 0 having the lowest address, to facilitate loading. The working copy of the pixels per line determines the number of pixels in each line.

If VIHSYNC is an input, then strictly, the number of pixels per line is determined by the number of valid pixels between each VIHSYNC. However, an imprecise number of pixels per line maybe input to the FBC, in which case any pixels exceeding the specified pixels per line are ignored. If less than the number of pixels per line re input before the next VIHSYNC then the remaining pixel locations in memory for that line are unchanged.

If VIHSYNC is an output, then the specified pixels per line determines the number of valid pixels input before VIHSYNC ends at the end of each line.

The maximum number of pixels per line is 8192 (0 represents 8192). BACKW must be zero for normal raster scan. If the incoming frame is required to be stored with the scan across the line from right to left instead of from left to right, then BACKW must be loaded with a one.

The Input Line Offset is 16 bits held in a two byte register. The addresses of the two byte registers within the FBC are consecutive, with byte 0 having the lowest address, to facilitate loading. The working copy of the Line Offset determines the number of pixel locations in memory between the start of the current line and the start of the next line.

The maximum line offset is 32767. The line offset must be loaded with a number not less than the number of pixels per line. UPW must be zero for normal raster scan. If the incoming frame is required to be stored with successive lines scanning UP the image from bottom to top (that is) to be stored with successive lines in decreasing locations in the frame buffer memory) then UPW must be loaded with a one.

For interlaced input, the start of line for the first line in the odd field is determined by the start address plus one line offset. The start of line for the first (half) line in the even field is the start address.

For multiple frame contiguous operation, the start address for the next frame is the start of line for the last line plus the line offset.

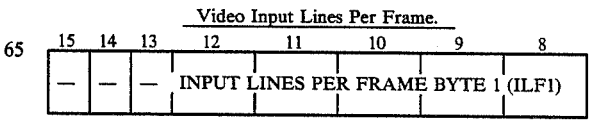

-continued

Video Input Lines Per Frame.

| 7 | 6 | 5 | 4 | 3 | 2 | 1 | 0 |
|---|---|---|---|---|---|---|---|
|   |   | INPUT LINES PER FRAME BYTE 0 (ILF0) |   |   |   |   |   |

The Input Lines per Frame is 16 bits held in a two byte register. Bits 13 to 15 of this register are dummy locations and the values read back from these bits are indeterminate. The addresses of the two byte registers within the FBC are consecutive, with byte 0 having the lowest address, to facilitate loading. The working copy of the Lines per frame determines the number of lines to be stored for each frame. If less lines are input before the next VIVSYNC then the remaining locations in memory are unchanged. If more lines are input than specified in the Lines per Frame then the excess is ignored.

The maximum number of lines per frame is 8192 (0 represents 8192).

For interlaced operation, the number of lines per frame specifies the total number of valid lines over the two fields within each frame and must therefore be an even number. A half line is stored with the first valid pixel at the start of line location in memory even if the half line is representing the right half of the line within the image. The rest of the line within memory is unchanged and may be indeterminate. The video output interface, when outputting an interlaced image, is compatible in its handling of the half lines.

VIDEO OUTPUT INTERFACE REGISTERS

Video Output Control Register

| 7 | 6 | 5 | 4 | 3 | 2 | 1 | 0 |
|---|---|---|---|---|---|---|---|
| — | CONTIG | MULT | EOF | MASK | END | START | NEW |

| | | |
|---|---|---|
| (BUSY) | | Internal flag, set by the positive edge of VOVSYNC. Reset by the end-of-frame. |
| NEW | Load 0 | No effect. |
|  | Load 1 | If BUSY=1 then wait until end-of-frame. When BUSY=0 copy NEW registers to working registers. |
|  | Read 0 | NEW registers have been copied to working registers. |
|  | Read 1 | Waiting for end-of-frame. |
| START | Load 0 | No effect. |
|  | Load 1 | When NEW=0, START after next positive edge of VOVSYNC. |
|  | Read 0 | Indicates 1st pixel in frame output. |
|  | Read 1 | Waiting for 1st pixel after START. |
| END | Load 0 | No effect. |
|  | Load 1 | If END=1 then reset END, cancel interrupt. If OEP and BUSY then abort, stop video input, reset BUSY. |
|  | Read 0 | End of frame/line not yet reached. |
|  | Read 1 | End of frame/line reached. Interrupt if not masked. |
| MASK | 0 | Enable END to cause interrupt. |
| EOF | 0 | End-of-line causes END. |
|  | 1 | End-of-frame causes END. |
| MULT | 0 | Stop after next end-of-frame. |
|  | 1 | Output Multiple frames. |
| CONTIG | 0 | Multiple frames use same START ADDRESS. |
|  | 1 | Multiple frames use contiguous start addresses. |
| (bit 7) |  | Dummy location. Value read back is indeterminate. |

The Output Control Register (OCTL) has immediate control over the operation of the video output. The NEW, START and END flags are used for the handshake between the processor and the video output interface. Each of these flags has a different significance when the OCTL is loaded, from when it is read. A load with any handshake flag reset has no effect, allowing the other flags to be used and to be located in the same register.

Video Output Configuration Register

| 7 | 6 | 5 | 4 | 3 | 2 | 1 | 0 |
|---|---|---|---|---|---|---|---|
| FORCE | SIDEW | ILACE | CRT | VSYNC | HSYNC | VALID | CLOCK |

| | | |
|---|---|---|
| CLOCK | 0 | VOCLOCK is an input. |
|  | 1 | VOCLOCK is an output at ½ SCLK. |
| VALID | 0 | VOVALID is an input, but may output a force LOW. |
|  | 1 | VOVALID is an output, but must detect when forced LOW. |
| HSYNC | 0 | VOHSYNC is an input, but may output a force LOW. |
|  | 1 | VOHSYNC is an output, but must detect when forced LOW. |
| VSYNC | 0 | VOVSYNC is an input, but may output a force LOW. |
|  | 1 | VOVSYNC is an output, but must detect when forced LOW. |
| CRT | 0 | Interface control signals are levels. |
|  | 1 | CRT mode: Interface control signals are pulses. |
| ILACE | 0 | Output is non-interlaced video. |

| | | |
|---|---|---|
| | 1 | Output is two-way interlaced. |
| SIDEW | 0 | Output is normal raster scan, successive pixels in a line. |
| | 1 | Output is sideways, successive pixels in a vertical column. |
| FORCE | 0 | Output is from the stored image. |
| | 1 | Output is from the FORCE PIXEL register. |

The Output Configuration Register (OCFG) does not have an immediate effect. Only when it is copied into the working copy of this register, under the control of NEW and BUSY, do the bits in this register have effect. A read from this register reflects the contents last loaded into the register, not the contents of the working copy.

The Output VSYNC Front Porce is 8 bits held in a one byte register. The working copy of the Output VSYNC Front Porch determines, in the special case CRT mode, the time from the end of frame to the VSYNC pulse. The units of this register are "half line times" where the line time, H, is specified in the Line Time register.

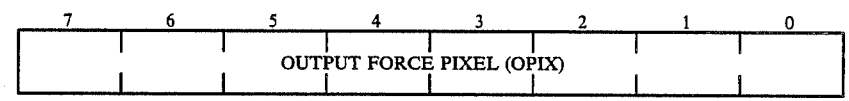

The Output Force Pixel is 8 bits held in a one byte register. The working copy of the Force Pixel determines the constant pixel value output when the Force Pixel flag is set in the output Configuration register. This is specified by the Pixels per Line and Lines per Frame. The Start Address and Line Offset are not used and memory is not accessed.

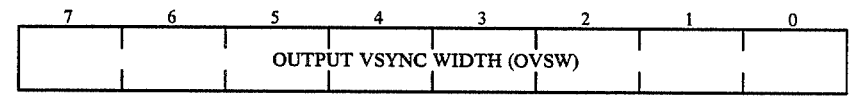

The Output VSYNC Width is 8 bits held in a one byte register. The working copy of the Output VSYNC Width determines, in the special case CRT mode, the width of the VSYNC pulse. The units of this register are "half line times" where the line time, H, is specified in the Line Time register.

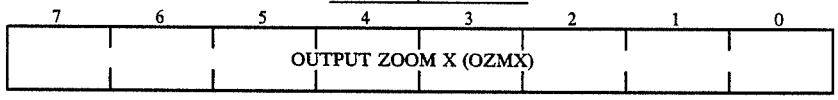

The Output Zoom X is 8 bits held in a one byte register. The working copy of the Output Zoom X determines the pixel repeat count for enlargement in the X dimension. The maximum enlargement is ×255.

Video Output VSYNC Back Porch.

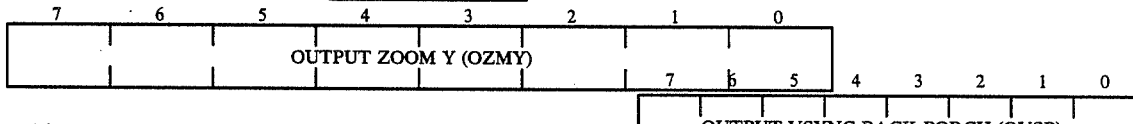

The Output Zoom Y is 8 bits held in a one byte register. The working copy of the Output Zoom Y determines the pixel repeat count for enlargement in the Y dimension. The maximum enlargement is ×255.

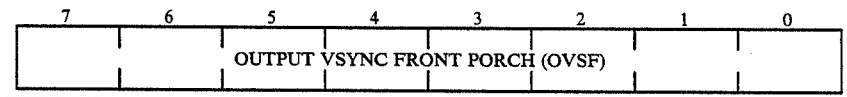

The Output VSYNC Back Porch is 8 bits held in a one byte register. The working copy of the Output VSYNC Back Porch determines, in the special case CRT mode, the time from the end of the VSYNC pulse to the first line output. The units of this register are "half line times" where the line time, H, is specified in the Line Time register.

Video Output HSYNC Front Porch. -

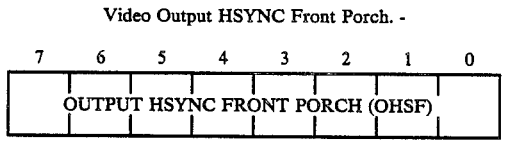

The Output HSYNC Front Porch is 8 bits held in in a one byte Register. The working copy of the Output HSYNC Front Porch determines, in the special case CRT mode, the time from the end of line to the HSYNC pulse. The units of this Register are "pixel times", that is, periods of VOCLOCK.

Video Output HSYNC Width. -

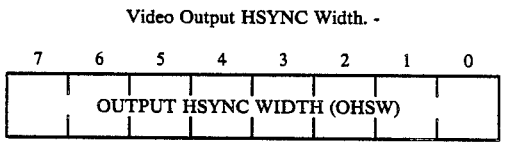

The Output HSYNC width is 8 bits held in a one byte Register. The working copy of the Output HSYNC Width determines, in the special case CRT mode, the width of the HSYNC pulse. The units of this Register are "pixel times", that is, periods of VOCLOCK.

Video Output HSYNC Back Porch. -

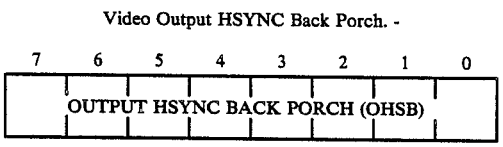

The Output HSYNC Back Porch is 8 bits held in a one byte Register. The working copy of the Output HSYNC Back Porch determines, in the special case CRT mode, the time from the end of the HSYNC pulse to the first line output. The units of this Register are "pixel times", that is, periods of VOCLOCK.

The minimum line recovery time, that is the sum of the HSYNC Front Porch, Width and Back porch, must allow sufficient time for the dynamic RAM to refresh.

For a system clock of 30 MHz, the minimum line recovery time is 3% of the Pixel per Line. For a system clock of 12 MHz, the minimum line recovery time is 7.5% of the Pixels per Line.

Video Output Start Address. -

OUTPUT START ADDRESS BYTE 3 (OSA3)

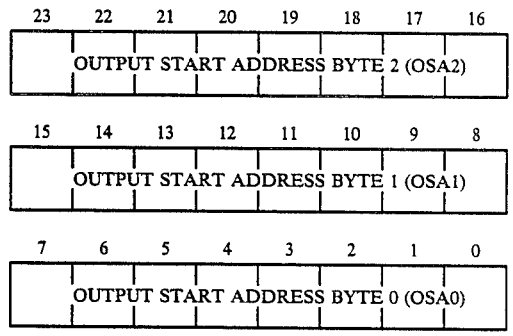

The Output Start Address is 25 bits held in a four byte Register. Bits 25 to 31 of this Register are dummy locations and the values read back from these bits are indeterminate. The addresses of these four registers within the FBC are consecutive, with byte 0 having the lowest address, to facilitate loading. The working copy of the start address determines the location in the frame buffer memory of the first pixel in the stored image to be output. The start address need not be on an 8-pixel boundary. When the output is to be taken from a window within a stored frame, the start address may be anywhere within that frame.

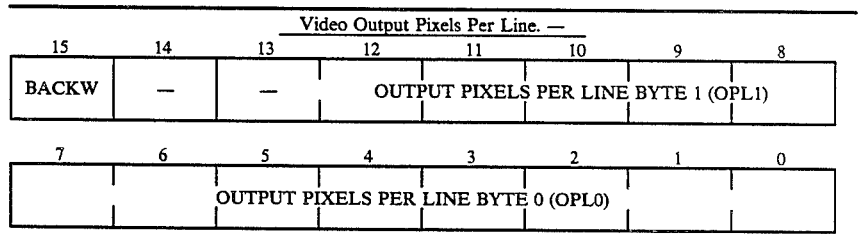

The Output Pixels per Line is 14 bits held in a two byte Register. Bits 13 and 14 of this Register are dummy locations and the values read back from these bits are indeterminate. The addresses of the two byte registers within the FBC are consecutive, with byte 0 having the lowest address, to facilitate loading. The working copy of the pixels per line determines the number of pixels in each line.

The maximum number of pixels per line is 8192 (0 represents 8192). BACKW must be zero for normal raster scan. If the stored frame is required to be output with the scan across the line from right to left instead of from left to right, then BACKW must be loaded with a one.

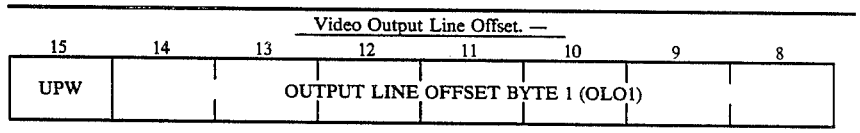

| 7 | 6 | 5 | 4 | 3 | 2 | 1 | 0 |
|---|---|---|---|---|---|---|---|
| | | | OUTPUT LINE OFFSET BYTE 0 (OLO0) | | | | |

OPW  0  Next line start = Current line start + Line Offset
     1  Next line start = Current line start − Line Offset The Output Line offset is 16 bits held in a two byte Register. The addresses of the two byte registers within the FBC are consecutive, with byte 0 having the lowest address, to facilitate loading. The working copy of the Line Offset determines the number of pixel locations in memory between the start of the current line and the start of the next line.

The maximum line offset is 32767. The line offset must be loaded with a number not less than the number of pixels per line. UPW must be zero for normal raster scan. If the stored frame is required to be output with successive lines scanning UP the image from bottom to top (that is, to be stored with successive lines in decreasing locations in the frame buffer memory) then UPW must be loaded with a one.

For interlaced output, the start of line for for the first line in the odd field is determined by the start address plus one line offset. The start of line for the first (half) line in the even field is the start address.

For multiple frame contiguous operation, the start address for the next frame is the start of line for the last line plus the line offset.

lowest address, to facilitate loading. The working copy of the Lines per frame determines the number of lines to be output for each frame.

The maximum number of lines per frame is 8192 (0 represents 8192).

For interlaced operation, the number of lines per frame specifies the total number of lines over the two fields within each frame. If an odd number is specified then a half line is output at the end of the odd frame and another half line is output at the beginning of the even field. The half line output at the beginning of the even field, although output during the second half of the line time, is taken from the start of line location of the stored image. This is compatible with the image storage from the input interface. The interlaced image is stored with line 0, the first line (or half line) of the even field first; then line 1, the first line of the odd field; and so on.

| Video Output Horizontal Line Time. — | | | | | | | |
|---|---|---|---|---|---|---|---|
| 15 | 14 | 13 | 12 | 11 | 10 | 9 | 8 |
| | | | OUTPUT HORIZONTAL LINE TIME BYTE 1 (OHLT1) | | | | |
| 7 | 6 | 5 | 4 | 3 | 2 | 1 | 0 |
| | | | OUTPUT HORIZONTAL LINE TIME BYTE 0 (OHLT0) | | | | |

The Output Horizontal Line Time is 16 bits held in a two byte Register. The addresses of the two byte registers within the FBC are consecutive, with byte 0 having the lowest address, to facilitate loading. The working copy of this determines H, the number of pixel clock

| Video Output Lines Per Frame. — | | | | | | | |
|---|---|---|---|---|---|---|---|
| 15 | 14 | 13 | 12 | 11 | 10 | 9 | 8 |
| — | — | — | OUTPUT LINES PER FRAME BYTE 1 (OLF1) | | | | |
| 7 | 6 | 5 | 4 | 3 | 2 | 1 | 0 |
| | | | OUTPUT LINES PER FRAME BYTE 0 (OLF0) | | | | |

The Output Lines per Frame is 16 bits held in a two byte Register. Bits 13 to 15 of this Register are dummy locations and the values read back from these bits are indeterminate. The addresses of the two byte registers within the FBC are consecutive, with byte 0 having the periods for the total line including HSYNC front porch, HSYNC width and HSYNC back porch. It is used for timing purposes only, in CRT mode, as the unit multiplier for the VSYNC front porch, VSYNC width and VSYNC back porch.

| PROCESSOR INTERFACE REGISTERS. | | | | | | | |
|---|---|---|---|---|---|---|---|
| Processor Control Register — | | | | | | | |
| 7 | 6 | 5 | 4 | 3 | 2 | 1 | 0 |
| — | — | ODD | TANDEM | PIXA | INCR | TEST | RESET |

-continued

| PROCESSOR INTERFACE REGISTERS. | | |
|---|---|---|
| TEST | 1 | Reset all elements. |
| | 0 | Normal. |
| INCR | 1 | Enter special test mode. |
| | 0 | Address of FBC Register not changed. |
| | 1 | Auto increment of Register address after each access. |
| PIXEL | 0 | Direct pixel access to frame buffer memory disabled. |
| | 1 | Direct pixel access to frame buffer memory enabled. |
| TANDEM | 0 | Normal. |
| | 1 | Tandem mode. |
| ODD | 0 | EVEN FBC when in Tandem mode. |
| | 1 | ODD FBC when in Tandem mode. |
| (bit 6) | Dummy location. | Value read back is indeterminate. |
| (bit 7) | Dummy location. | Value read back is indeterminate. |

MEMORY INTERFACE REGISTER

Memory Control Register

```
 7     6     5   4     3     2     1     0
|REFRESH RATE  |  NOREF  |  —  | ALTER | 256K |
```

| | | |
|---|---|---|
| 256K | 0 | 64K Memory Parts. |
| | 1 | 256K Memory Parts. |
| ALTER | 0 | 64K Nibble Address bits are CA3 and CA6 |
| | 1 | Alternative Nibble Address decode. |
| NOREF | 0 | Refresh Normal |
| | 1 | No refresh. Used for test purposes only. |
| REFRESH | 1 | 1 Refresh required for every 8-pixel access. |
| | 15 | 1 Refresh required for every 15 8-pixel accesses. |
| | 0 | 1 Refresh required for every 16 8-pixel accesses. |

Memory Top Register

```
 7   6   5   4   3   2   1   0
|       MEMORY TOP (MTOP)       |
```

The Memory Top is 8 bits held in a one byte Register. The working copy of this indicates the number of banks (×16 bits) of 64 K locations that are attached to the FBC. It is used to form a wrap around when handling contiguous multiple frames.

Memory Pixel Address.

MEMORY PIXEL ADDRESS BYUTE 3 (MPA3)
```
23   22   21   20   19   18 17 16
|   MEMORY PIXEL ADDRESS BYTE 2 (MPA2)   |

15 14   13   12   11   10    9  8
|   MEMORY PIXEL ADDRESS BYTE 1 (MPA1)   |

7  6    5    4    3    2    1  0
|   MEMORY PIXEL ADDRESS BYTE 0 (MPA0)   |
```

The Memory Pixel Address is 25 bits held in a four byte Register. Bits 25 to 31 of this Register are dummy locations and the values read back from these bits are indeterminate. The addresses of these four registers within the FBC are consecutive, with byte 0 having the lowest address, to facilitate loading. The working copy of the pixel address determines the location in the frame buffer memory of the direct pixel access.

The Memory Pixel address may be instantly loaded by a multiple byte address on the processor interface. Otherwise, this Register may be loaded, a byte at a time, as all other registers are loaded.

Access to this Register may corrupt the Input Start Address Register.

Memory Direct Pixel Access.

```
 7   6   5   4   3   2   1   0
|      MEMORY PDIRECT PIXEL ACCESS      |
```

The Memory Access is not a Register, but the Register address internal to the FBC, which gives direct pixel access to the frame buffer memory. This is only required when the memory Pixel Address is supplied byte at a time.

The Memory Pixel Address is automatically incremented to the next pixel according to the window for the video input interface after each access.

INTERFACE DESCRIPTIONS

The operation of each of the four interfaces shall now be described in detail.

VIDEO INPUT INTERFACE

The video input interface may be connected to any video source, such as the digitized output from a camera, or the output from some other Vision Stream Processing product.

The video input clock (VICLOCK) may be programmed as an input signal or an output signal. If VICLOCK is an output signal then it is synchronized to the system clock (SCLK) but at one third of the frequency. If VICLOCK is an input signal then a synchronous clock, at one third of the system clock frequency, or any continuous, synchronous clock, up to one third of the system clock frequency, may be input.

All of the remaining video input interface signals, (VIVSYNC, VIHSYNC, VIVALID and VIDATAO-7), are internally synchronized to the video input clock (VICLOCK), whether this is an input or an output. Thus all of these signals, as inputs, must be valid before the set-up time before the positive edge of VICLOCK, and must remain valid until at least the hold-time after the same positive edge of VICLOCK.

If any of the video input interface signals, (VIVSYNC, VIHSYNC, VIVALID and VIDATA0-7), are programmed as outputs then these also are internally synchronized to the video input clock (VICLOK), whether this is an input or an output. Thus all of these signals, as outputs, are valid before the output-delay time after the positive edge of VICLOCK and remain valid until at least the output-hold-time after the next (or some subsequent) positive edge of VICLOCK.

FRAME TIMING

The VIVSYNC signal controls the frame timing. If it is programmed as a "Frame Valid" input then the positive edge indicates start of frame. If it is programmed as "Frame Request" output then it is asserted when the FBC is ready to input the next frame, and it remains asserted until the frame, or desired part of a frame, has been transferred. The negative edge indicates the end of the desired frame, or part of a frame where the rest of the line is not required. For interlaced input the FBC recognizes the low-high transition of VIVSYNC pulse as the strt of field pulse. If this is detected coincident with the low-high transition of VIHSYNC then this is recognized as an odd field for interlaced frames; otherwise this is recognized as an even field. (Edge detection is synchronized with VICLOCK). This would be suitable for interfacing with the digitized output from a camera.

LINE TIMING

The VIHSYNC signal controls the line timing. If it is programmed as a "Line Valid" input then the positive edge indicates start of line. If VIHSYNC is programmed as "Line Request" output then the positive edge indicates request for a new line, and it remains asserted until the line, or desired part of a line, has been transferred. The negative edge indicates the end of the desired line, or part of a line where the rest of the line is not required. For interlaced input the FBC recognized the low-high transition of VIHSYNC pulse as the start of the line pulse.

PIXEL TIMING

The VIVALID signal determines the validity of the data on the video input data bus (VIDATA0-7). If it is programmed as an input then data is a valid pixel in the cycle following when VIVALID was asserted. If VIVALID is programmed as bidirectional then when VIVALID is input high to indicate valid pixel VIVALID may be pulled down to interrupt the flow of pixels. When VIVLAID is released and it is high, or when it next goes high, then the data in the following cycle is the valid next pixel.

VIDEO OUTPUT INTERFACE

The video output interface may be connected to any video destination such as the input of some other Vision Processing System product, or in the special case CRT mode: directly to a CRT.

The video output clock (VOCLOCK) may be programmed as an input signal or an output signal. If VOCLOCK is an output signal then it is synchronized to the system clock (SCLK) but at one third of the frequency. If VOCLOCK is an input signal then a synchronous clock, at one third of the system clock frequency, or any continuous, asynchronous clock, up to one third of the system clock frequency, may be input.

All of the remaining video output interface signals, (VOVSYNC, VOHSYNC, VOVALID and VODATA0-7), are internally synchronized to the video output clock (VOCLOCK), whether this is an input or an output. Thus all of these signals, as outputs, are valid before the output-delay time after the positive edge of VOCLOCK and remain valid until at least the output-hold-time after the next (or some subsequent) positive edge of VOCLOCK.

If any of the video output interface signals (VOVSYNC, VOHSYNC, VOVALID and VODATA0-7), are programmed as inputs then these also are internally synchronized to the video input clock (VOCLOCK), whether this is an input or an output. Thus all of these signals, as inputs, must be valid before the set-up time before the positive edge of VOCLOCK, and must remain valid until at least the hold-time after the same positive edge of VOCLOCK.

The video data output bus (VODATA0-7) may be programmed to be tri-state controlled by VOVALID. There is a turn-on delay from the positive edge of VOCLOCK following VOVALID asserted, and a turn-off delay from the positive edge of VOCLOCK following VOVALID released.

FRAME TIMING

The VOVSYNC signal controls the field timing. If it is programmed as a "Frame Valid" output. The low-high transition indicates start of frame. If it is pulled low then the frame is aborted. If it is programmed as a "Frame Request" input then the frame is output when VIVSYNC is asserted. In the special case CRT mode VIVSYNC is the vertical synchronization pulse. The delay from the last valid pixel to the start of the VOVSYNC pulse (vertical front porch) is programmable, the width of the VIVSYNC pulse is programmable an the delay from the end of the VIVSYNC pulse to the start of valid pixels (vertical back porch) is also programmable. If VOHSYNC, is asserted coincident with VIVSYNC then this indicates an odd field for interlaced frames, otherwise this indicates an even field. This would be suitable for interfacing to a CRT.

LINE TIMING

The VOHSYNC signal controls the line timing. If it is programmed as a "Line Valid" output then VOHSYNC is asserted before the start of the line and remains asserted until after the end of the line.

If VOHSYNC is programmed as "line request" input then the positive edge indicates a request for a new line, and it remains asserted until that line, or desired part of a line, has been transferred. The negative edge indicates the end of the desired line, or part of a line where the rest of the line is not required. If VOVSYNC remains asserted after the entire line has been transferred then the same line is repeated. In the specific case CRT mode, VOHSYNC is a horizontal synchronization pulse. The delay from the end of the line to the start of the VOHSYNC pulse (horizontal programmable) and the delay from the end of the VOHSYNC pulse to the start of the next line (horizontal back porch) is also programmable.

PIXEL TIMING

The VOVALID signal determines the validity of the data on the video input date bus (VIDATA0-7). If it is programmed as an output then data is a valid pixel in the cycle following when VIVALID was asserted.

If VOVALID is programmed as bidirectional then when VOVALID is output high to indicate valid pixel VOVALID may be pulled down to interrupt the flow of pixels. When VOVALID is released and it is high, or when it next goes high, then the data in the following cycle is the valid next pixel. The video output date bus (VODATA0-7) is in the tri-state condition one cycle delayed from when VOVALID is low.

MICROPROCESSOR INTERFACE

The Microprocessor interface is suitable for connection with little or no external logic, to any modern microprocessor, such as the 16000 family (i.e. National Semiconductor) or the 68000 family (i.e. Motorola).

The signals on the microprocessor interface may be considered as either synchronous or asynchronous. If the signals are synchronous with the system clock (SCLK) then a higher speed transfer can take place.

The chip select signal (PCS_B) serves to enable the microprocessor interface. Address information is entered from the bus (PBUS0-7) during the address strobe (PAS_B). Write data may be entered from the bus (PBUS0-7) if the write strobe (PWR_B) is asserted. Read data may be presented on the bus (PBUS0-7) if the read strobe (PRD_B) is asserted. If the data transfer cannot proceed, for example because of memory refresh, then the PRDY signal is pulled down until the transfer can proceed. As maskable interrupt (PINT_B) may be used to interrupt to the microprocessor.

REGISTER LOAD

To load one of the registers, the specific 8-bit Register address is presented on the bus (PBUS0-7) during the address strobe. Only one address strobe (PAS_B) indicates a Register access. Then the data to be loaded into the Register is presented on the bus during the write strobe. Thus the FBC may be considered as a memory mapped peripheral on the memory bus with some high order decode being used to generate the chip select (PCS_B). Or the FBC may be considered as a peripheral with two peripheral addresses (one address line), where the byte transferred to first address is the Register address within the FBC and the byte transferred to or from the second (peripheral) address is the Register contents.

REGISTER READ

To read one of the registers, the 8-bit address is presented, as for a Register load. The contents of the Register are read out onto the bus (PBOS0-7) during the read strobe (PRD_B). The read strobe must not go low until after the address strobe has gone high.

DIRECT PIXEL ACCESS TO VIDEO FRAME BUFFER

The maximum size of the frame buffer is 32 M Pixels. A 25 bit address is required to access any one pixel in the frame. In a large system, there may be many frame buffers. To ensure only one frame buffer is addressed by this 25 bit address, the direct pixel access enable flag must be set in one frame buffer prior to any pixel access. For a pixel access four 8-bit bytes of address must be supplied, least significant first. The most significant bit of the most significant byte must be a one to indicate a direct pixel access. The four address bytes are transferred during four address strobes (PAS_B) after the chip select (PCS_B). Then the pixel may be overwritten by writing a byte during a write strobe (PWR_B). Refer to the timing diagram of FIG. 9. Or the pixel may be read by applying a read strobe (PRD_B). The read strobe must not go low until after the last address strobe has gone high. Refer to the timing diagram of FIG. 10.

In some cases the specific location in memory may be in the process of a refresh cycle or being accessed by one of the video interfaces. If this is so then PRDY is pulled down until the transfer can proceed. The maximum delay is approximately 30 periods of the system clock (SCLK) which is about 1 microsecond for a 30 MHz clock.

FIG. 10 shows PRDY being pulled down to delay the read transfer.

MULTIPLE BYTE DATA

In addition to permitting the transfer of a multiple byte address, the FBC also permits multiple byte data. If the address portion of the microprocessor access points to a direct pixel access, then successive data bytes transferred cause the address to be incremented according to the window information set up in the video input registers. If a Register is addressed, successive bytes transferred access the successive increment of the logical address of the registers.

CONFIGURATION

The microprocessor interface may be configured for different processor families. A number of FBC's may be configured together, for example to process colored images. Exact synchronization between such FBC's should be maintained.

MEMORY INTERFACE

The memory interface may be connected directly to 64 K or 256 K dynamic RAM (with nibble mode capability) or to a memory system (with nibble mode capability).

A minimum memory system utilizes 16 DRAM parts, 64 K or 256 K, together with 2 fast octal flip-flops (74F374).

All the memory interface signals are synchronized to the system clock (SCLK).

An 8-bit row address and an 8 bit column address is used to address the memory. This only gives a 64 K address range. Nibble mode is always used, therefore the address decode for which of the 4 bits in the nibble is not required. Thus two 8-bit addresses (row address and column) address are sufficient to access 256 K DRAM. The 9th address pin of the 256 K DRAM, which is used to decode which of the 4 bits within a nibble, is not required and must be tied to ground.

The memory data bus is 16 bits wide allowing two 8-bit pixels to be written or read from the memory during one access. Dynamic random access memory (DRAM) parts with nibble mode capability are used so four accesses may be achieved for each cycle. Thus a total of eight 8-bit pixels may be accessed for each complete nibble mode cycle. These 8 pixels are held in an internal Register.

Although 8-bit pixels may be used, any number of bits, up to 8, may be used per pixel. A binary video memory requires only one bit per pixel in unpacked format. The number of DRAMs may be reduced accordingly.

A video data input rate of up to 10 MHz may be supported simultaneously with a video output data rate of 10 MHz. To achieve this, memory cycles are alternated between the input access and the output access. When the microprocessor requires direct access to the video frame buffer it shares the input access whether it is reading from or writing to the buffer.

The operation of alternating memory accesses may be described in simplified form as follows. There is an 8-pixel Register for input access and another for the output access. The 8-pixel input Register is loaded from the video input interface at the video input rate of up to 10 MHz. Thus it becomes full after 8 pixel periods of 100 ns, that is after 800 ns. In one memory access taking 400 ns the 8-pixel Register is written to memory. In the alternate 400 ns the memory is read and the 8-pixel output Register is loaded. The 8-pixel output Register is transferred to the video output interface at the video output data rate of up to 10 MHz. Thus it becomes empty after 8 pixel periods of 100 ns, that is after 800 ns.

The refresh requirement is achieved by a mix of compulsory and voluntary refresh cycles shared between the input access and the output access. A refresh cycle may occur once every 15.625 microseconds and will occur on a voluntary basis if the memory is not being accessed by either interface. If the memory is not available, then a count of the number of "missed" slots is maintained, and at the end of the line this number of refreshes occurs on a compulsory basis. The maximum line length of 8K pixels with the minimum system clock frequency of 12 MHz ensures that the overall refresh requirement for all of memory to be refreshed every 2 milliseconds is not exceeded. In order not to overload the power supply by over refreshing, the refresh rate Register must be adjusted according to the system clock frequency. Thus the FBC can support continuous video data within a given line, but there must be an interruption between lines for refresh and other purposes.

IMPLEMENTATION DETAILS

To reduce the number of pins for the memory interface, address and data can be multiplexed. This and other implementation details for the illustrated embodiment shall now be discussed.

Since the address information, for block address, row address and column address share the same bus (MEMBUSO-15) as the data to or from the memory, the memory outputs must be buffered so that read data is not confused with the column address when the column address strobe (MEMCAS_B) is asserted. Thus a read enable signal (MEMRE_B) is provided so that memory read data is gated onto the bus (MEMBUSO-15) only after the column address has been removed.

After a read access the external read data buffer (74F374), controlled by MEMRE_B must turn off before the block and row address for the next access may be presented on the bus. Thus there is a delay after MEMRE_B is released (high) before the bus output drivers are turned on.

In order to allow for larger memory systems where there is a delay in the read data path, the read data is loaded into an external Register, that is the octal flip-flops (74F374). The subsequent read data available on the memory bus (MEMBUSO-15) is then input some time later, in fact after the following column address strobe (MEMCAS_B) is asserted (low). Thus external flip-flops are required and external latches would not suffice. To further increase the permissible system delay in the read data path the first column address strobe is shorter for read cycles than for write cycles.

The microprocessor may access an individual pixel. When reading the video frame buffer, only one of the 8 pixels read from memory is transferred to the microprocessor interface. Subsequent microprocessor reads from the video frame buffer may not require a memory access if the pixel is held in the 8-pixel Register. When the microprocessor writes a pixel to the frame buffer the FBC commences an access to the 8-pixel location, but asserts either the upper or lower write enable (MEMWEU_B) or (MEMWEL_B) during one of the four column address strobes (MEMCAS_B). For this reason two write enable signals are required.

Similarly, two write enable signals are required where the start or end of a line written to the memory does not coincide with the 8-pixel boundaries. The appropriate write enable lines (MEMWEU_B and MEMWEL_B) are asserted only during the column address strobes (MEMCAS_B) corresponding to the desired pixel locations within the 8-pixel group.

What is claimed is:

1. Digital video information control apparatus for use on a video processing system in conjunction with a digital memory for control and storage of digital video information, comprising:

programmable input means, for input of said digital video information for selective storage in the digital memory and for output of said digital video information, comprising a plurality of programmable control registers for controlling the input means, video input buffers for buffered input and output of said digital video information, a plurality of control signal inputs for input of data validation and synchronization signals, and a clock input;

programmable output means, for selective output of said digital video information stored in the digital memory, comprising a plurality of programmable control registers for controlling the output means, video output buffers for buffering output of said digital video information, a plurality of control signal outputs for output of said data validation and synchronization signals, and a clock signal output;

processor interface means, coupled to the video input buffers and the programmable registers, for bidirectional exchange of data with the input buffers for storage to and recall from the digital memory and for transfer of control data to the programmable registers; and memory interface means, for exchange of digital video data with the digital memory and the video buffers and for providing control signals for control of the memory responsive to control signals from the input and output means programmable control registers.

2. The apparatus of claim 1 further comprising, differential counter means, coupled to the input means, the output means and the processor interface means, for controlling simultaneous input of said digital video data to the programmable input means and output of said digital video data from the programmable output means responsive to the control data to prevent incoming data from overwriting outgoing data in the digital memory.

3. The apparatus of claim 2 wherein the differential counter means comprises a counter which is incremented responsive to a first synchronization signal to said output means, and decremented responsive to a second synchronization signal to said input means, and further comprises means for disabling the input means when the counter is zero and enabling the input interface means when the counter is non-zero and when the outgoing data reaches the end of a frame.

4. The apparatus of claim 1 wherein said apparatus is configured for de-interlacing video information supplied in a two field interlaced format and storing the video information in continuous memory locations.

5. The apparatus of claim 4 wherein said apparatus is configured for interlacing output of digital video information from the digital memory and for generating appropriate synchronization signals for an interlaced display.

6. The apparatus of claim 1 wherein said apparatus is configured for output of digital video information stored in the digital memory in the form of an image frame, wherein the digital video information is output in a sideways fashion accessing digital video data by successive columns across the frame.

7. The apparatus of claim 1 wherein the processor interface means is configured for coupling video data from any memory location in the digital memory to the processor interface means, responsive to a direct pixel access flag and input of a memory address through the processor interface means.

8. The apparatus of claim 1 wherein the digital memory is a dynamic random access memory (DRAM) and said memory interface means further comprises refresh means for automatically refreshing said DRAM.

9. A frame buffer controller system for coupling to a stream of pixel data of video image signals, comprising:
   read-write memory for selectively storing and outputting the pixel data;
   video input interface means for selectively buffering and inputting the pixel data;
   video output interface means for selectively buffering and outputting the pixel;
   controller interface means coupled to the memory and to the video input interface means and to the video output interface means for controlling memory bidirectional access responsive to the video input and output interface means; and
   processor interface means for providing control signals to said video input and video output interface means.

10. The system as in claim 9 further characterized in that said memory is dynamic RAM (DRAM), and
   said controller interface means additionally manages DRAM refresh.

11. The system as in claim 10 further characterized in that said controller interface means accesses said DRAM in nibble mode.

12. The frame buffer system as in claim 9 wherein said frame buffer controller system internally controls the buffering of the read and write of data to said memory, internally interleaving the input and output of data to said memory, so as to provide for effective simultaneous input and output of data from the frame buffer system.

13. The system as in claim 9 wherein,
   said video input and video output interface means are each further comprised of control registers, programmable responsive to said processor interface means, for controlling sequencing of storage and retrieval of data from said memory.

14. The system as in claim 13 wherein said control registers are further comprised of
   interface registers, readable and writable responsive to the processor interface means;
   working registers, coupled to communicate with said interface registers,
   wherein said working registers control the sequencing of the storage and retrieval of data from memory.

15. The frame buffer controller system of claim 9 further comprising a first clocking input coupled to said video input interface means, a second clocking input coupled to said video output interface means, and a third clocking input coupled to said processor interface means, said first, second and third clocking inputs allowing asynchronous operation of said video input, video output and processor interface means.

* * * * *